United States Patent

Kurata et al.

[11] Patent Number: 5,307,609
[45] Date of Patent: May 3, 1994

[54] APPARATUS FOR WRAPPING AND METHOD THEREFOR

[75] Inventors: Akihide Kurata; Katsuaki Wakahara, both of Fujisawa; Kazuhiko Kurihara; Hiroshi Yazawa, both of Tokyo; Toshikazu Oishi, Kawaguchi; Shuichi Murakami, Tokyo; Yukio Matsumura, Kawaguchi; Yoichi Mazawa, Yono, all of Japan

[73] Assignees: Nippon Petrochemicals Co., Ltd.; Polymer Processing Research Inst., Ltd., both of Tokyo, Japan

[21] Appl. No.: 820,639

[22] PCT Filed: May 28, 1991

[86] PCT No.: PCT/JP91/00717
§ 371 Date: Jan. 21, 1992
§ 102(e) Date: Jan. 21, 1992

[87] PCT Pub. No.: WO91/18792
PCT Pub. Date: Dec. 12, 1991

[30] Foreign Application Priority Data

May 28, 1990 [JP] Japan ............... 2-135242
May 28, 1990 [JP] Japan ............... 2-135243

[51] Int. Cl.⁵ .................................................. B65B 11/04
[52] U.S. Cl. ............................... 53/556; 53/441; 53/587; 264/290.2
[58] Field of Search .......... 53/399, 441, 141, 587, 53/556; 264/290.2

[56] References Cited

U.S. PATENT DOCUMENTS

| | | | |
|---|---|---|---|
| 2,490,781 | 12/1949 | Cloud | 53/556 X |
| 2,597,041 | 5/1952 | Stakes | 53/556 X |
| 2,702,406 | 2/1955 | Reed | 264/290.2 |
| 3,807,004 | 4/1974 | Andersen | 264/290.2 |
| 3,833,973 | 9/1974 | Schwarz | 264/290.2 |
| 4,077,179 | 3/1978 | Lancaster | 53/556 X |
| 4,116,892 | 9/1978 | Schwarz | 264/290.2 |
| 4,144,008 | 3/1979 | Schwarz | 264/290.2 |
| 4,765,120 | 8/1988 | Phillips | 53/441 |
| 4,891,715 | 6/1989 | Suga | 53/556 |
| 5,003,752 | 4/1991 | Matsumoto | 53/441 |
| 5,103,621 | 4/1992 | Matsumoto | 53/587 |

FOREIGN PATENT DOCUMENTS 343453 11/1989 European Pat. Off. ........... 53/441

Primary Examiner—John Sipos
Attorney, Agent, or Firm—Bucknam and Archer

[57] ABSTRACT

A wrapping apparatus which comprises:
means for supplying a band-like member,
means for stretching the band-like member in at least lateral direction thereof, the lateral stretch means comprising a unit for running the band-like member to spread out the member so that it forms a sector (an unfolded fan) and a unit for detachably gripping the regions (or margins) of the band-like member respectively near the opposite widthwise ends thereof so that they are detachable from the running unit, and
means for winding the stretched band-like member around an article for the wrapping thereof.

As one embodiment of the present invention, a method for wrapping an article with said wrapping apparatus is disclosed.

18 Claims, 23 Drawing Sheets

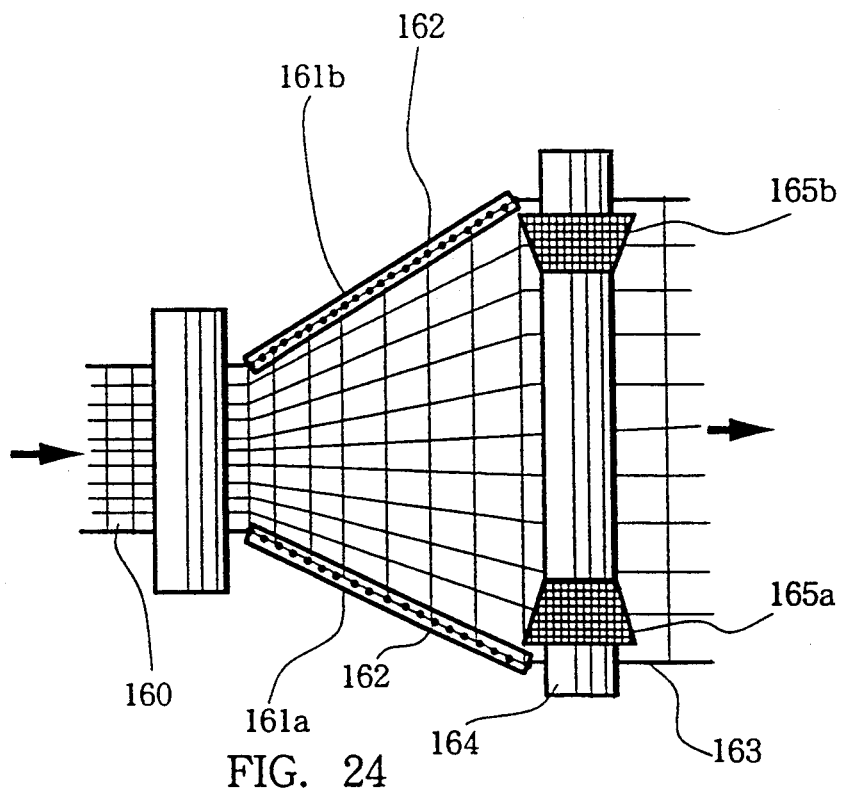
FIG. 24
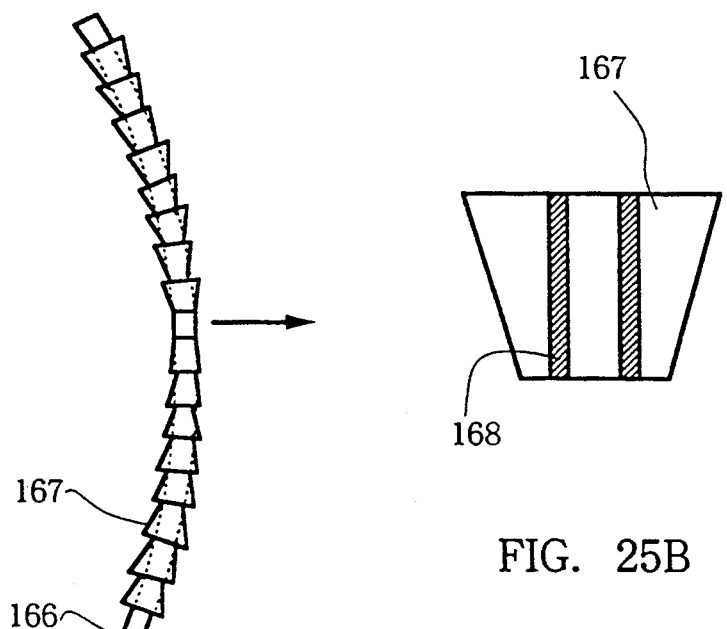
FIG. 25A
FIG. 25B

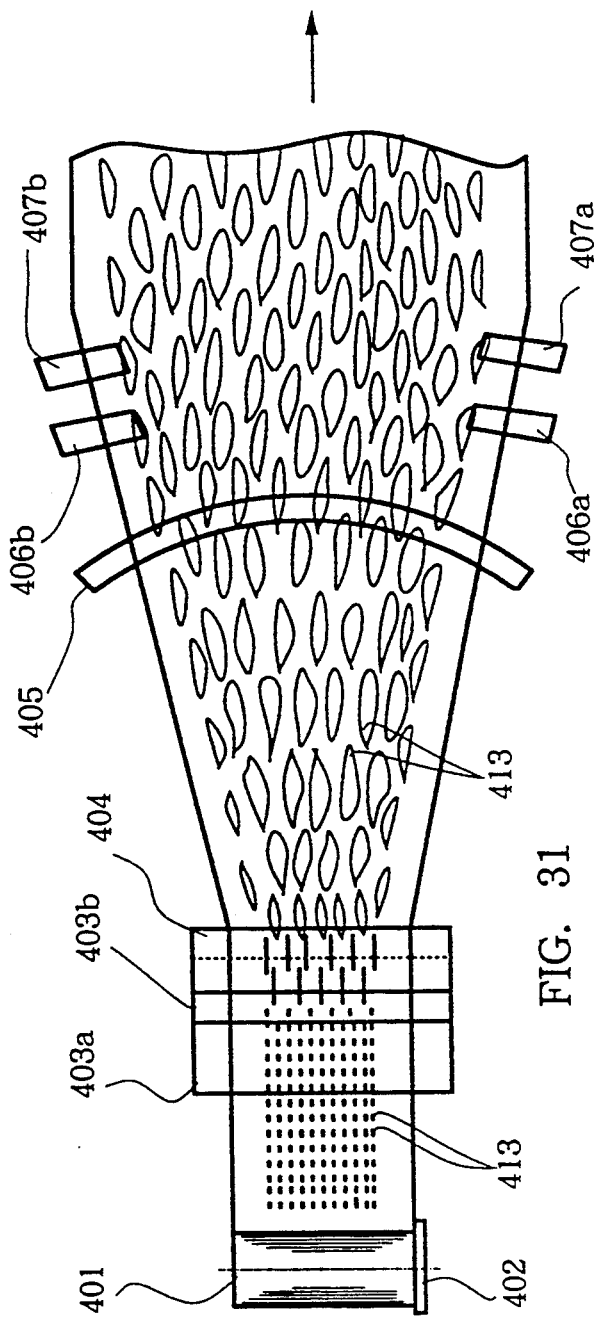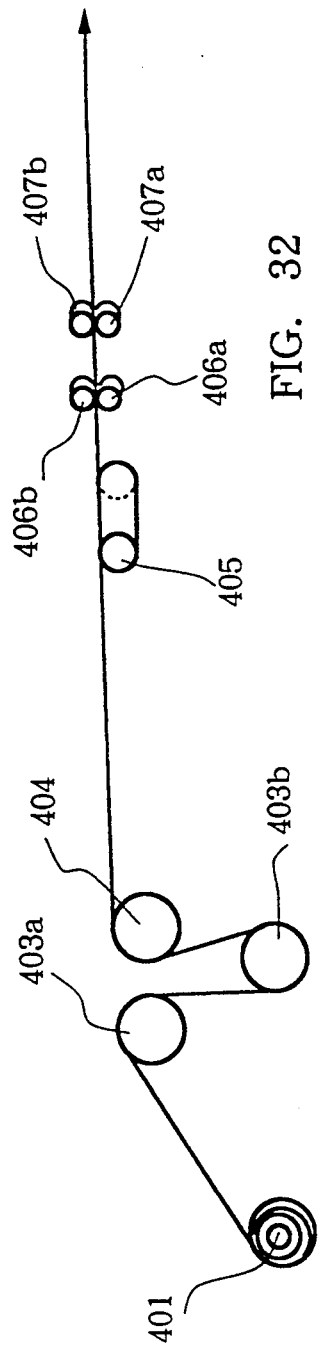
FIG. 31
FIG. 32

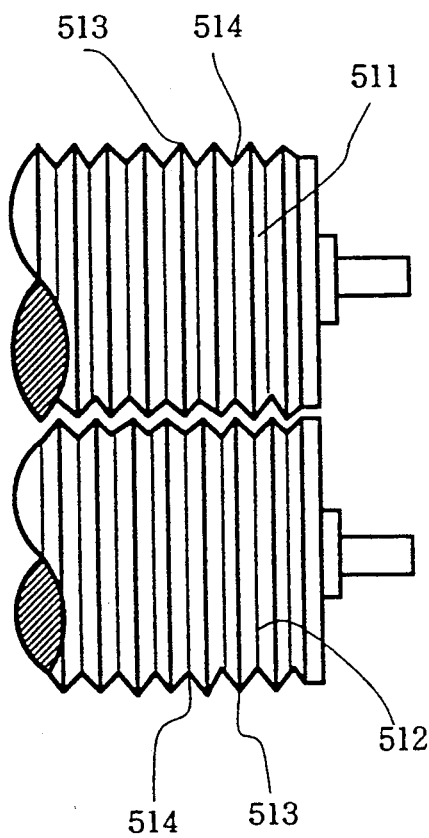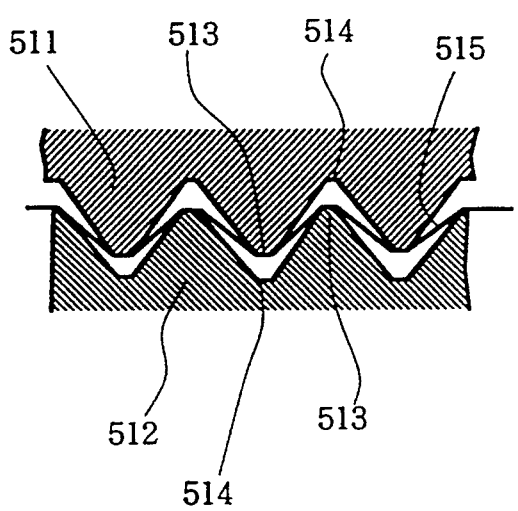
FIG. 34B
FIG. 34A

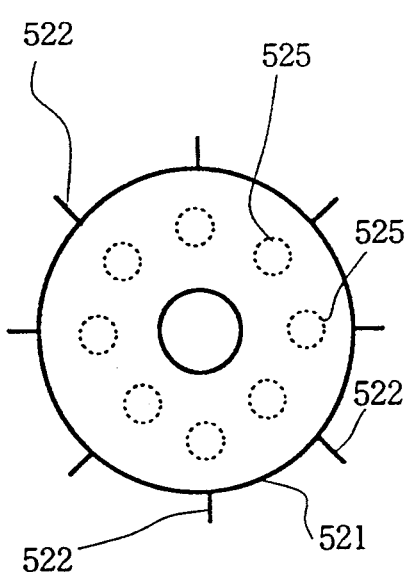
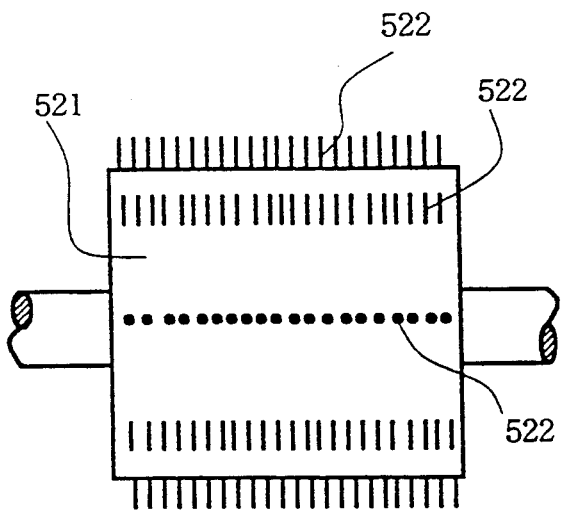
FIG. 35  FIG. 36
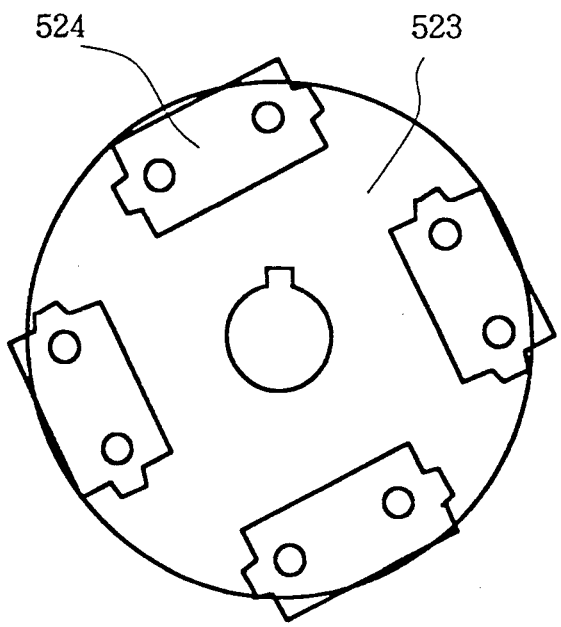
FIG. 37

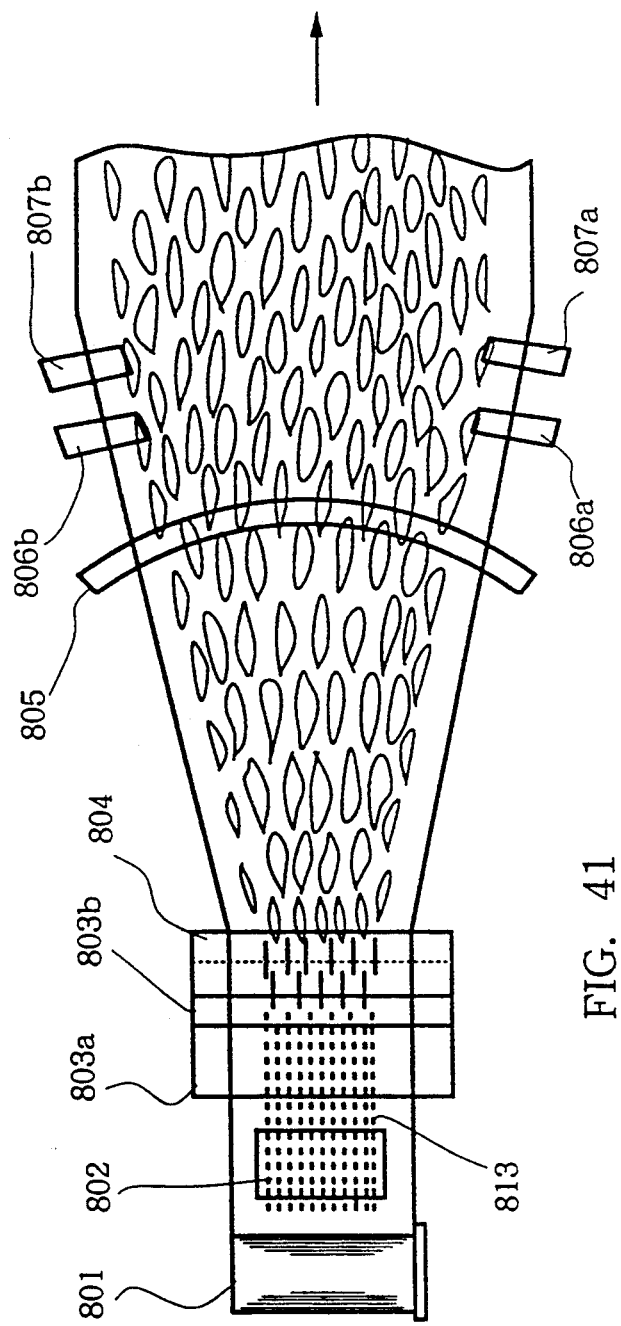
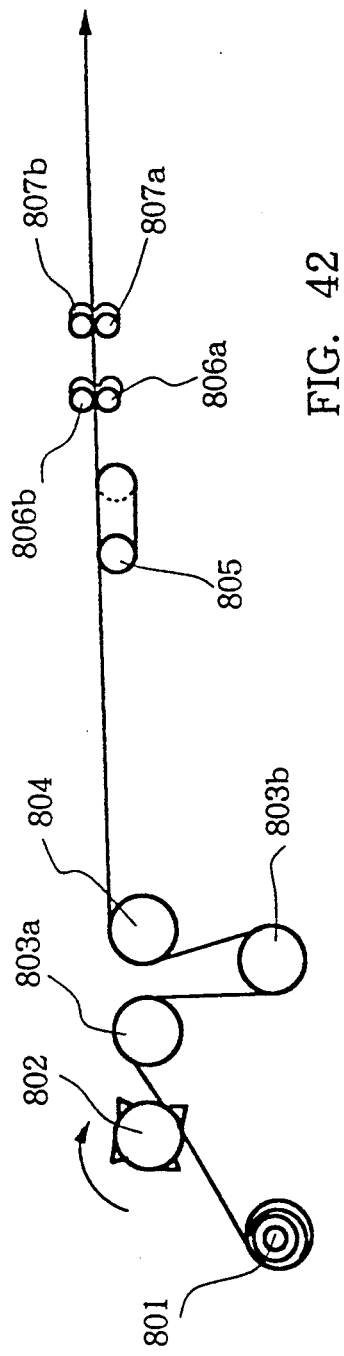
FIG. 41
FIG. 42

APPARATUS FOR WRAPPING AND METHOD THEREFOR

BACKGROUND OF THE INVENTION

1. Field of the Invention

The present invention relates to an apparatus for wrapping an article with a stretch film and a method therefor.

2. Description of the Related Art

As a conventional method of wrapping an article, a method for wrapping an article with a shrinkable film has been used, which comprises heating the article through a heating tunnel or the like and then wrapping the article by a shrinking force cause by heating. This method required a heating means and thus has raised the problem that a large heating tunnel is required for a large article, resulting in incurring high film and system costs.

In place of this method, a method for wrapping called pallet or stretch wrapping has been known and used in recent years. This method involves winding a film, while stretching it, around articles, or grass or a roll of paper stacked on a pallet, thus wrapping the article. In recent years, this wrapping method has been developed and contributed to the rationalization of transportation, storage, wrapping of articles. A wrapping method now in prevalent use, comprises longitudinally stretching a film with a winding tension exerted on an article and then wrapping the article with the shrinking force of the stretched film. There is also provided another method for wrapping an article comprising longitudinally stretching a film and then wrapping the article with an appropriate winding tension (Japanese Patent Publication Nos. Sho 59-52087 and 61-27254). A stretch wrapping (pallet wrapping) system does not require a heating means such as a heating tunnel. Since this system requires a less expensive apparatus cost, is suitable for wrapping a large article and has thus come to be widely used in recent years.

According to these conventional wrapping methods, in order to wind a film around the entire side surfaces of an article, the film must be wound to form multiple plies while they partially overlap each other because the film has a width which is smaller than the height of the article. When a normal 500-mm wide film is used, the film must be wound in 10–15 plies around an article having a height of 1 to 1.5 meters.

In order to reduce the number of turns or plies, a film having a larger width has been considered. However, a wide roll film is inconvenient for handling during its transportation and for mounting it on a wrapping apparatus. It is difficult to uniformly wind, in a roll-like manner, a wide thin (about 25 $\mu$m) film with one or both surfaces being coated with an adhesive. It is also difficult to manufacture a wide film.

In order to generally reduce the amount of the film used, a film having a thickness as small as possible is desirably manufactured to reduce the wrapping cost. A film tends to be very stretchable and is coated with an adhesive. It is, therefore, difficult to manufacture a film having a thickness of 10 $\mu$m or less whether it is large or small in width.

A lateral stretch system generally used in the film industry has been considered to stretch a film having a small width laterally to obtain a wide film. Any lateral stretch system, however, is not always suitable for pallet wrapping. For example, as lateral stretch apparatuses generally used in the film industry, a tenter apparatus and a tubular biaxial stretch apparatus are available. These apparatuses are expensive, require a large installation floor area, and are not practical for pallet wrapping needing simplicity and convenience. In a tubular biaxial stretch system, production lines must be stopped every wrapping cycle, and it is, therefore, difficult to maintain the internal pressure of a tube constant. It is also difficult to cut a soft, adhesive tubular film and develop it into a flat sheet. The tubular biaxial stretch system requires a certain running distance to develop the tube into a sheet and results in a bulky apparatus.

A variety of other easy-to-handle lateral stretch apparatuses in addition to the above apparatuses are proposed in the film industry. Of these apparatuses so proposed, hardly any ones are in practical use because it is difficult for them to carry out uniform stretching difficult. Slight stretch irregularity of a biaxial stretch film may cause a winding strain. A film having a winding strain results in a defective product.

A known easy-to-handle lateral stretch apparatus is a lateral stretch apparatus using a pair of rollers each having a roll surface constituted by a combination of protrusions and recessed grooves (Japanese Patent Publication No. Sho 46-11599 and others). According to this apparatus, a lateral stretch magnification is small, and stretching is performed at a maximum magnification of about 1.5 times. In particular, if a roll film to be used in pallet wrapping is stretched at about room temperature, a large shrinking stress will be caused. For this reason, the roll film will immediately shrink after being stretched, and, therefore, the effect of lateral stretching is low. Even if the film is stretched laterally, the film is not stretched in the widthwise direction; there is therefore needed an independent step of stretching the film in the widthwise direction.

Another conventional easy-to-handle stretch apparatus is a stretch apparatus utilizing pulleys (BP 849,436). The present inventors have proposed a variety of pulley type stretch apparatuses (e.g., Japanese Patent Publication Nos. Sho 61-55456 and 57-30368). Still another conventional easy-to-handle stretch apparatus is exemplified by a stretch apparatus having a large number of grippers (Japanese Patent Publication No. Sho 63-44049) and needle-like pins planted in the periphery of a rotary disc. Such a conventional rotary disc type lateral stretch apparatus cannot be applied to pallet wrapping because this apparatus allows a laterally stretched film to run horizontally in its longitudinal direction.

The conventional wrapping methods described above are excellent in air-tightness because articles are wrapped with films. For this reason, these wrapping methods are often not suitable for articles such as vegetables and fruits in the fields requiring air or moisture permeability and the fields requiring prevention of dew condensation. As a manufacturing problem, the film width is reduced after longitudinal or lateral stretching, thereby reducing wrapping efficiency. In particular, in lateral stretching, a remarkable widthwise shrinkage occurs after the film is stretched laterally.

There is also available a conventional method using a net-like material as an air-permeable wrapping material and stretching this material along its longitudinal direction. This method, however, results in higher cost than a method using a film. In addition, when an article is large in size, a greater number of turns is undesirably needed for wrapping the article because a net width is small. Therefore, the method using the net-like material is much less practical due to the consumption of a large amount of the material and a long wrapping time.

SUMMARY OF THE INVENTION

It is an object of the present invention to provide a simple, compact apparatus for wrapping and a method therefor.

It is another object of the present invention to provide an apparatus for wrapping and a method therefor, allowing a less amount of a film to be used for wrapping and a shorter time to be taken therefor.

It is still another object of the present invention to provide an apparatus for wrapping and a method therefor, capable of reducing widthwise shrinkage which has posed a serious problem in the stretch step of a conventional process when an air-, moisture-permeable and dew condensation-preventing wrapping is intended.

In order to achieve the above objects of the present invention, there is provided a wrapping apparatus for stretching a band-like member and winding the stretched band-like member around an article, which comprises means for supplying a band-like member, a means for stretching the band-like member at least in the lateral direction thereof, the lateral stretch means being provided with means for running the band-like member while widening the member to form a sector or spreading it out like an unfolded fan and means for gripping regions (margins) respectively near opposite widthwise ends of the band-like member in such a manner that the regions are detachable from the running means, and means for winding the band-like member around the article.

Preferably, the running means comprises: a first running portion moving along a first endless route which has a first forward path used for running of the region near one of the opposite widthwise ends of the band-like member and a first backward path not used for running of the band-like member; and a second running portion moving along a second endless route which has a second forward path used for running of the region near the other one of the opposite widthwise end portions of the band-like member, the widthwise space between the second forward path and the first forward path being gradually increased as the band-like member runs, and a second backward path not used for running of the band-like member.

For example, the running unit comprises a first rotary disc having the first running portion formed on the peripheral portion of the disc and a second rotary disc having the second running portion formed on the periphery of the second disc, and the gripping means comprises a first gripping member for detachably fixing the region of one widthwise end of the band-like member to the first running portion, and a second gripping member for detachably fixing the region of the other widthwise end of the band-like member to the second running portion.

Preferably, this wrapping apparatus further comprises guide means for guiding the band-like member gripped by the gripping means. For example, the guide means comprises a guide member for guiding the band-like member so that the difference in running length of the band-like member is reduced in the widthwise direction. For example, the guide member comprises a first guide portion for guiding a central portion of the band-like member and a second guide portion for guiding portions between the central portion of the band-like member and the respective opposite widthwise ends thereof. The wrapping apparatus may have means for heating the band-like member.

In addition, the wrapping apparatus may have longitudinal stretch means for stretching the band-like member in the longitudinal direction thereof. The longitudinal stretch means comprises a longitudinal post-stretch mechanism for longitudinally stretching the band-like member after the band-like member is laterally stretched by the lateral stretch means. Preferably, the longitudinal post-stretch mechanism comprises a stretch member for longitudinally stretching the laterally stretched band-like member released from the running means while the amount of widthwise shrinkage cause by a widthwise shrinking force of the laterally stretched band-like member is small. The longitudinal post-stretch mechanism comprises means for longitudinally stretching the band-like member at a winding speed of the winding means, which is made higher than a band-like member feeding speed of the lateral stretch means.

The longitudinal stretch means comprises a longitudinal pre-stretch mechanism for longitudinally stretching the band-like member before the band-like member is laterally stretched by the lateral stretch means. The longitudinal pre-stretch mechanism comprises means for longitudinal stretching the band-like member, for example, at a band-like member introducing speed of the lateral stretch means, which is made higher than the band-like member supply speed of the supplying means.

Preferably this wrapping apparatus comprises means for regulating a tension for winding the band-like member around the article. The winding means comprises means for rotating the article to wind the band-like member around the article. The rotating means comprises a turntable on which an article placing region having a predetermined height is defined. The lateral stretch means comprises means for stretching the band-like member in the lateral direction so that the band-like member has a larger width than the height of the article placing region. For example, the rotating means comprises means for rotating the article about an axis except for a vertical axis.

Preferably, this wrapping apparatus further comprises means for preventing widthwise shrinkage of the laterally stretched band-like member. Preferably, this wrapping apparatus further comprises means for charging the stretch magnification.

According to the present invention, there is also provided a wrapping apparatus for stretching band-like member and winding the stretched band-like member around an article, comprising means for supplying the band-like member, means for stretching the band-like member in at least one of longitudinal and lateral directions, means for winding the stretched band-like member around the article, and hole forming means forming holes in the band-like member before the band-like member is wound around the article.

Preferably, this wrapping apparatus further comprises means for heating the hole forming means before the winding means winds the band-like member around the article. For example, the hole forming means comprises means for forming slits parallel to the stretch direction of the stretch means. Preferably, this wrapping apparatus further comprises width increasing means for increasing the width of the band-like member stretched by the stretch means and perforated by the hole forming means.

A wrapping method according to the present invention is comprise the steps of supplying a band-like member, stretching the band-like member to increase the air-permeability density of the band-like member, and winding the stretched band-like member around an article.

Preferably, this wrapping method further has a step of increasing the width of the stretched band-like member. This band-like member may be a perforated band-like member or a band-like member perforable by stretching.

In addition, there is provided a wrapping method of winding a band-like member around an article, which comprises the steps of stretching the band-like member having a width smaller than that of the article in at least the lateral direction of the member to have a width larger than that of the article, and winding the stretched band-like member around the article such that the band-like member covers all side surfaces of the article by one turn, and one side edge portion of the band-like member extends from at least one end portion of the article.

BRIEF DESCRIPTION OF THE DRAWINGS

FIG. 24 is a view showing a structure in which frustoconical widthwise shrinkage preventive devices are arranged at both ends of the outlet of a lateral stretch unit;

FIG. 25A is a view a structure in which frustoconical widthwise shrinkage prevention units are mounted on an arcuated bar, and FIG. 25B is a sectional view of each frustoconical widthwise shrinkage preventive unit;

FIG. 31 is a side view showing a wrapping apparatus according to a fifth embodiment of the present invention;

FIG. 32 is a plan view of the apparatus shown in FIG. 31;

FIGS. 34A and 34B are schematic views showing groove roll type lateral stretch apparatus;

FIGS. 35 and 36 are schematic views showing a pin roll;

FIG. 37 is a sectional view a cutting blade slitter;

FIG. 41 is a side view showing a wrapping apparatus according to a ninth embodiment of the present invention; and FIG. 42 is a plan view of the apparatus shown in FIG. 41.

DETAILED DESCRIPTION OF THE PREFERRED EMBODIMENTS

Figure 1:
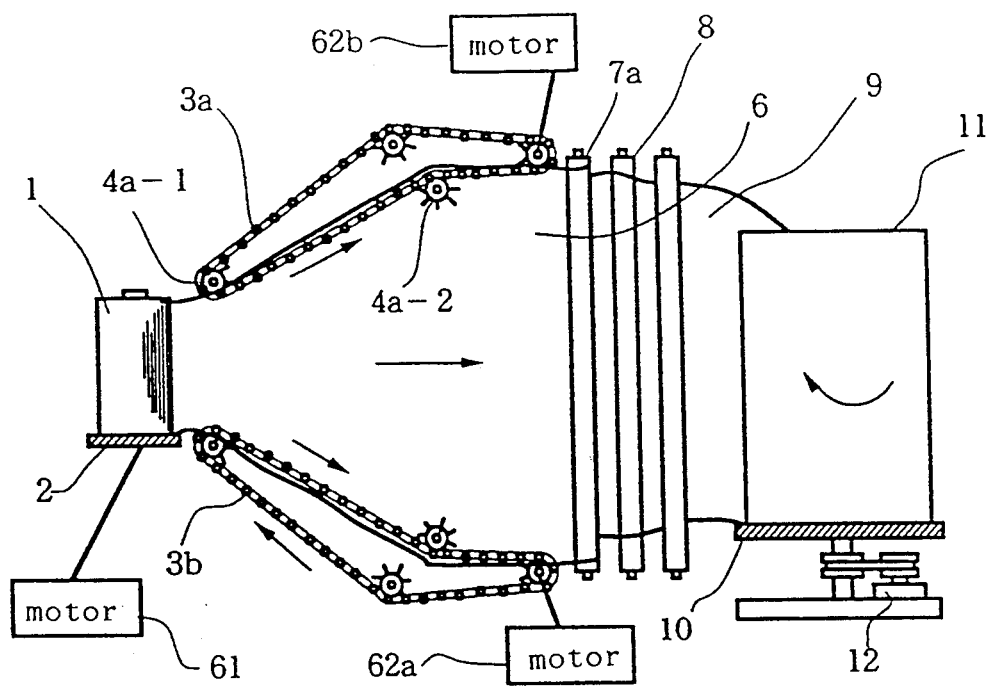
FIG. 1 is a side view showing a wrapping apparatus according to a first embodiment of the present invention.
Figure 2:
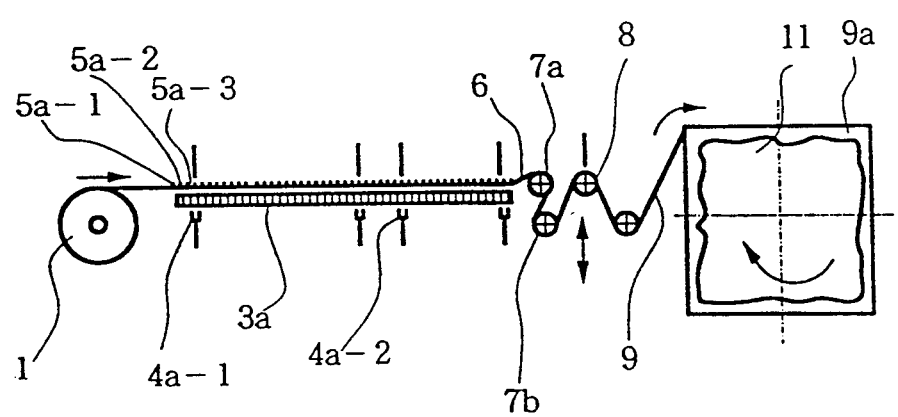
FIG. 2 is a plan view showing the apparatus shown in FIG. 2.

The first embodiment and its modifications of the present invention will be described with reference to FIGS. 1 and 2. FIGS. 1 and 2 are a side view and a plan view, respectively, showing a wrapping system using a portable pin tenter lateral stretch apparatus. An original roll film 1 in the form of a roll stands upright and is placed on a table 2. The width of the original roll film 1 is smaller than the height of an article 11. Upper and lower chains 3a and 3b are guided by chain wheels 4a-1, 4a-2, . . . . A large number of needle-like pins 5a-1, 5a-2, 5a-3, . . . (to be briefly referred to as pins 5 hereinafter) extend on the chains 3a and 3b. These components constitute a pin tenter lateral stretch apparatus. Both side edge portions of the original roll film 1 are hooked and gripped by the pins 5. The original roll film 1 runs along a spreading path defined between the chains 3a and 3b to stretch the original roll film 1 laterally, i.e., vertically in FIG. 1. The original roll film 1 is stretched to have a width larger than the height of the article. When the original roll film 1 is stretched at a predetermined magnification (preferably, an apparatus stretch magnification is 2.2 times or more), the paths defined by the chains 3a and 3b become parallel to each other. At a portion where the paths of the chains 3a and 3b are parallel to each other, polymer molecules of the stretched original roll film 1 are aligned to each other. The original roll film 1 is separated from the pins 5 at the terminal end of the tenter and serves as a laterally stretched film 6. The width of the laterally stretched film 6 is larger than the height of the article.

Longitudinal stretch rolls 7a and 7b are arranged next to the pin tenter unit. A dancer roll 8 is arranged next to the longitudinal stretch rolls 7a and 7b. An article 11 placed on a turntable 10 is placed next to the dancer roll 8. Upon rotation of the turntable 10, the article 11 is rotated. By rotation of the turntable 10 by a plurality of revolutions, almost all the side surfaces of the article 10 are wrapped with a laterally and longitudinally stretched film 9. The stretched film 9 is wound around all the side surfaces of the article 11 so that one side edge portion of the film 9 extends from the upper or lower end of the article 11. Reference numeral 9a denotes one side edge of the film 9 which extends from the upper or lower end of the article 11. The turntable 10 is kept rotated at a constant rotation speed by a motor 12 or constant tension by a torque motor.

This embodiment is characterized in that the film runs upright and is extended laterally, i.e., vertically in FIG. 1. The lateral stretch apparatus of this embodiment is also characterized in that both side edge portions of the original roll film are gripped and the film is stretched along tho spread path formed by the gripper portions. Lateral stretching by gripping both the side edge portions can assure a large lateral stretch magnification and can obtain a predetermined lateral stretch magnification. Therefore, this lateral stretch apparatus is suitable as a lateral stretch means for stretching a film to have a width larger than the height of the article. A typical example of the lateral stretch apparatus is a tenter type lateral stretch apparatus used in film industries. A tenter type lateral stretch apparatus used to biaxially stretch a polypropylene or polyester film can be used as a compact, portable apparatus when it is used in this embodiment because the stretch speed may be low and slight stretch variations are allowed. In addition, this apparatus does not require heat. As another conventional stretch means of this embodiment, a pulley stretch apparatus disclosed in Japanese Patent Publication Nos. Sho 57-30368 and 61-55456 as the prior-art inventions of the present inventors.

After the laterally stretched film passes the dancer roll, the film is wound around the article rotated on the turntable by a winding tension of the article while the film is longitudinally stretched, thereby wrapping the side surfaces of the article. According to this method, since the length of longitudinal stretching is large, widthwise shrinkage of the laterally stretched film is large, but the resultant apparatus is easy to handle.

Still another characteristic feature of this embodiment is a combination of the lateral stretch apparatus, the longitudinal stretch apparatus, and the turntable for supporting and rotating the article.

The width of the pallet wrapping film can be increased in this embodiment. The width of the film can be increased to a width larger than the height of the article, so that almost all the side surfaces of the article can be wrapped with the film by one turn. In this case, "wrapping of almost all the side surfaces of the article by one turn" indicates that at least one of the turns satisfies wrapping of almost all the side surfaces of the article. In particular, it is important to partially wind the article with the film, and all the side surfaces of the article need not be wound by the first turn.

In general biaxial stretch apparatus, and particularly, a portable biaxial stretch apparatus, longitudinal stretching is performed first, and then lateral stretching is performed because the longitudinal stretch apparatus can have a small width. In this embodiment, however, longitudinal stretching is performed after lateral stretching because the force for holding an article upon winding of the articles on the pallet with the film is large and article misalignment rarely occurs according to experimental results. However, after slight longitudinal stretching is performed, lateral stretching and then further longitudinal stretching may be performed because a total longitudinal stretch magnification can be advantageously increased. In this case, the first longitudinal stretch magnification is preferably 100% or less.

In this embodiment, the lateral stretch magnification is at least twice, and preferably 2.5 times or more because the width of the original roll film is increased at a low stretch magnification. The width of a pallet wrapping stretch film is generally 500 mm. It is inconvenient to cause one operator to wrap an article with a film having a width larger than 500 mm. The height of an article generally falls within the range of about 1 to about 1.5 mm. After lateral stretching is completed, the film must be stretched at a considerably high magnification when incapability of maintaining a constant width and widthwise contraction are taken into consideration. The width of an original roll cannot be unlimitedly increased due to manufacturing limitations of original rolls. Therefore, the lateral stretch magnification preferably falls within the range of at least twice, and preferably 2.5 times or more in accordance with economical and operational viewpoints.

When original stretch films are measured by a tensile test of JIS Z1702 (wrapping polyethylene film), each of the longitudinal and lateral stretch magnifications is preferably 300% or more. When the magnification preferably exceeds 400%, a film is apparently excellent in biaxial stretching. In addition, when the strength retention ratio of a 100% stretched film in the longitudinal direction is 50% or more, and preferably 60% or more, a stable state of a pallet-wrapped article can be obtained.

If the above requirements are satisfied, examples of a polymer used for this film are LLDPE (Linear Low-Density Polyethylene), LDPE (Low-Density Polyethylene), EVA (Ethylene-Vinyl Acetate Copolymer), polybutadiene, polyvinyl chloride, and polyvinylidene chloride. These polymers are blended or formed into a multi-layered structure. An adhesive agent such as a liquid rubber (e.g., polybutene) and a petroleum resin is blended and applied to the surface of a polymer layer.

According to the first embodiment, the following effects which were not obtained in the conventional techniques can be obtained.

(1) Although the width of an original roll can be small, a film having a large width may be used to perform pallet wrapping. The original roll having a small width ca be used to provide the following effects.

A film can easily be transported to a parallel wrapping machine. Although the original roll must be set upright, it is easy for each operator to mount it because it has a small width. It is difficult to form an adhesive original roll having a uniform thickness and a large width. As in this embodiment, however, it easy to form an original roll having a small width.

(2) Biaxial stretching is performed to obtain a wide original roll from a narrow original roll. Unlike a conventional technique, a mechanism for vertically reciprocating (traverse) the position of the original roll position need not be used. In addition, the width of the original roll can be stretched to have a width enough to wrap all side surfaces of an article by one turn.

Since each original roll is stretched to have a smaller thickness and wound around an article, the original roll can be saved, i.e., the amount of film used can be reduced. In the conventional method involving performing only longitudinal stretching, since the original roll film must be vertically reciprocated, the number of turns is inevitably increased. When a 20-μm thick film was longitudinally stretched twice and the stretched film was wound 15 times around an article having one side of 1,600 mm, a total amount of film used was 480 cm$^3$ (=50 cm (width)×0.02 cm (thickness)×4 sides×1,600 cm×15 turns/(stretching twice)). However, this film can be also longitudinally stretched twice by biaxial stretch and the stretched film can be wound around the article four times. Therefore, even if a film having a thickness of 40 μm is used, a total amount of film used is 256 cm$^3$ (=50 cm (width)×0.004 cm (thickness)×4 sides×160 cm×4 times (stretching twice)), which can be one half of the amount of film used in the conventional technique.

A film having a small width must be wound by forming overlapping portions. Dust tends to be collected on the overlapping portions and moisture tends to permeate through the overlapping portions. These problems may be solved if the above drawbacks are eliminated without wrapping an article with a wide film.

Since biaxial stretching is performed, biaxial shrinkage stresses (i.e., shrinkage stresses in the widthwise and longitudinal directions of the film) of the film act on an article wrapped with a film having a width larger than the height of the article. Since both side edges of the film extend from the upper and lower portions of the article, the widthwise shrinkage forces of the film act from its upper and lower ends toward its center, thereby applying an appropriate binding force on the article. A binding force is often excessively applied to an article by only uniaxial stretching. According to this embodiment, however, even if a film is longitudinally wrapped so as to prevent damage of the article, strong binding can be performed by utilizing vertical (widthwise) shrinkage stresses acting on the article. When biaxially stretched film having a small width is helically wound around an article, the widthwise shrinkage stress is not applied in wrapping of the article.

(3) With the lateral stretch apparatus for gripping both side edges of a film and laterally stretching the film, a stretch magnification is set high, and optimal stretching can be performed.

By variably changing the lateral stretch magnification, products having different widths can be advantageously manufactured from an original roll having a given width. By variably changing a stretch magnification, film shrinkage forces (article binding forces) can be variably changed to obtain an optimal wrapping form of the article.

(4) In a normal film, a thin portion is localized at a few positions to form necks. In this embodiment, by using an original roll film having a longitudinal thickness pattern having longitudinal stripes having a thickness different from that of the remaining portion, thin and thick portions of the stretched film can be almost uniformly, distributed in the widthwise direction. In addition, tearing can stop at this stripe, thus providing physical advantages.

Table 1 shows experimental results of various types of films by using an apparatus according to the first embodiment. The elongation of the film was measured by the tensile test of JIS Z1702. A strength retention ratio is defined as remaining fraction of the total strength when a film is stretched to a 100% elongation and this stretched state is maintained for 30 minutes. The thickness of each original roll film was 40 μm. Stretch property measurement was performed by using the apparatus shown in FIG. 1, except that the lateral stretch apparatus portion was a pulley type lateral stretch apparatus shown in FIG. 4 (to be described later). Experiments were conducted using a pulley diameter of 1,000 mm and variously changing the lateral stretch magnification. The longitudinal stretch magnification by a stretch roll was fixed to twice. The biaxial stretch properties were examined by experiments for winding each film by four turns at a turntable speed of 8 rpm. In Table 1, a mark ⊚ represents that a film could be stretched at a magnification of 4.5 times, a mark ○ represents that a film could be stretched at a magnification of 3.5 times, a mark Δ represents that a film could be stretched at a magnification of 2.5 times or more, and a mark x represents that a film was not stretched at a magnification of 2.5 times. At a lateral stretch magnification of 2.5 times, a substantial stretch magnification as the overall width of the film is about 2.2 times. In high elongation measurements, an original roll film having an elongation of 300% or less has poor biaxial stretch properties. Stable stretching can be apparent performed at an elongation of 400% or more.

Forty heavy bags (overall weight: 1 t) each containing polypropylene pellets having an overall weight of 25 kg on a pallet were wrapped. These bags were wrapped by winding a film four times. A lateral stretch magnification of the film was set to 2.5 to 3.5 times, and a longitudinal stretch magnification was set to twice. The wrapped articles were left still for 3 days. The wrapped articles were inclined together with the pallet to check wrapping stability. The articles were misaligned at an inclination angle of 45°, as indicated by a mark x, and the articles were not misaligned at an inclination angle of almost 90°, as indicated by a mark ⊚. Other marks represent misalignment values between the 0° inclination and the 90° inclination. It is apparent from Table 1 that a film having a strength retention ratio of 50% or less has poor wrapping stability. It is apparent that high stability can be achieved at a strength retention ratio of 60% or more.

TABLE 1

Basic Properties of Original Roll Film and Optimal Pallet Wrapping Conditions

| Symbol | Film Composition | Strength kg/cm² Longitudinal | Strength kg/cm² Lateral | Elongation % Longitudinal | Elongation % Lateral | Strength Retention Ratio % Longitudinal | Maximum Stretch Magnification | Wrapping Stability |
|---|---|---|---|---|---|---|---|---|
| Example 1 | A Corp: Stretch film (LLDPE) | 378 | 279 | 517 | 607 | 68.6 | c | ○ |
| Example 2 | B Corp: Stretch film (LLDPE + LDPE) | 315 | 387 | 645 | 656 | 66.3 | ○ | ○ |
| Example 3 | C Corp: Stretch film (LLDPE + EVA) | 297 | 261 | 385 | 450 | 64.5 | ○ | ○ |
| Example 4 | D Corp: Stretch film (LLDPE) | 153 | 135 | 360 | 380 | 58.3 | Δ | Δ |
| Example 5 | E Corp: Stretch film (EVA VA15%) | 223 | 140 | 482 | 467 | 61.2 | ○ | ○ |
| Comparative Example 1 | | 279 | 198 | 196 | 288 | 59.5 | x | Δ |
| Comparative Example 2 | Vinyl chloride | 306 | 252 | 343 | 434 | 47.1 | Δ | x |
| Comparative Example 3 | EVA (VA8%) | 378 | 171 | 151 | 380 | 60.8 | Δ*[1] | ○ |
| Comparative Example 4 | PP (T die film) | 423 | 405 | 600 | 679 | 34.6 | ○*[2] | x |

*[1] x = longitudinal
*[2] heating required

Original roll films used in this embodiment must have specific physical properties. More specifically, each original roll film must have a stretch property and must comprise a stretch film not susceptible to misalignment of wrapped articles. The following results are obtained from the above experimental results.

The thickness of the original roll film preferably falls within the range of 15 μm to 120 μm and more preferably 15 μm to 80 μm. When a film having a thickness of 25 μm or less is biaxially stretched, the film may be torn. When the thickness of a film is 15 μm or less, tearing of the film is undesirably increased. Therefore, these film thicknesses are not suitable for pallet wrapping requiring stable wrapping. In normal wrapping having a film thickness of 80 μm or less, if particularly rigid wrapping is required and unless an original roll film having a thickness of 120 μm or less is used, a winding tension is undesirably increased to damage the article. In stretching using a thick film, a stretch tension is increased to require a heating unit or increase a mechanical strength, thereby losing an advantage as an easy-to-handle stretch apparatus. Use of a thick film causes an increase in wrapping cost, resulting in an impractical application. In the general manufacture using a commercially available wrapping film in biaxial stretching, the thickness of the original roll film preferably exceeds 100 μm and is often be about 200 μm.

The table 2 may be braked to apply a supply tension on the original roll film 1 to perform longitudinal stretching prior to lateral stretching of the film 1. This longitudinal stretching can be performed such that a supply speed of the original roll film 1 is set to be higher than that of the infeed speed of the chains 3a and 3b. More specifically, the speed of the motor 61 for driving the table 2 is set low, and the speed of motors 62a and 62b for driving the chains 3a and 3b are set high, so that the supply speed of the original roll film 1 is set higher than the feed speed of the chains 3a and 3b. After the film 1 is longitudinally stretched, it is hooked by the pins 5 formed on the chains 3a and 3b and is then laterally stretched. The laterally stretched film 6 may be longitudinally stretched by the longitudinal stretch rolls 7a and 7b. However, since the film is already stretched in the longitudinal direction, longitudinal stretching by the rolls 7a and 7b may be omitted.

The film 9 passes through the dancer roll 8 (this may be omitted) and is wound around the rotating article 11 while the film is being longitudinally stretched by a tension caused by the dancer roll and the winding force on the turntable. More specifically, the film 1 is longitudinally stretched and wound in accordance with the difference between the supply speed of the film 1 from the dancer roller 8 and the winding speed of the film 1 wound around the article 11.

Up to the process before the lateral stretch apparatus, the original roll film 1 need not be almost longitudinally stretched, and the longitudinal stretch roll arranged upon lateral stretching may be omitted. In this case, as in the above modification, the film 1 is wound around the article while the film 1 is longitudinally stretched by a winding tension of the article 11. More specifically, the outfeed speed of the laterally stretched film from the chains 3a and 3b is set lower than a winding speed of the film around the article. For this purpose, the speed of the motors 62a and 62b is set low, and the speed of the motor 12 is set high.

In the lateral stretch apparatus, longitudinal stretching of the original roll film 1 is not almost performed. After lateral stretching may be performed, the film is longitudinally stretched by the longitudinal stretch rolls 7a and 7b, the film may be wound around the article 11 with an optimal wrapping tension. This minimizes widthwise shrinkage of the film.

The film 1 may be longitudinally stretched between the lateral stretch apparatus and the roll 7a. This longitudinal stretching may be added after the longitudinal stretching in each modification described above or may be performed in place of the longitudinal stretching of each modification.

Figure 3:
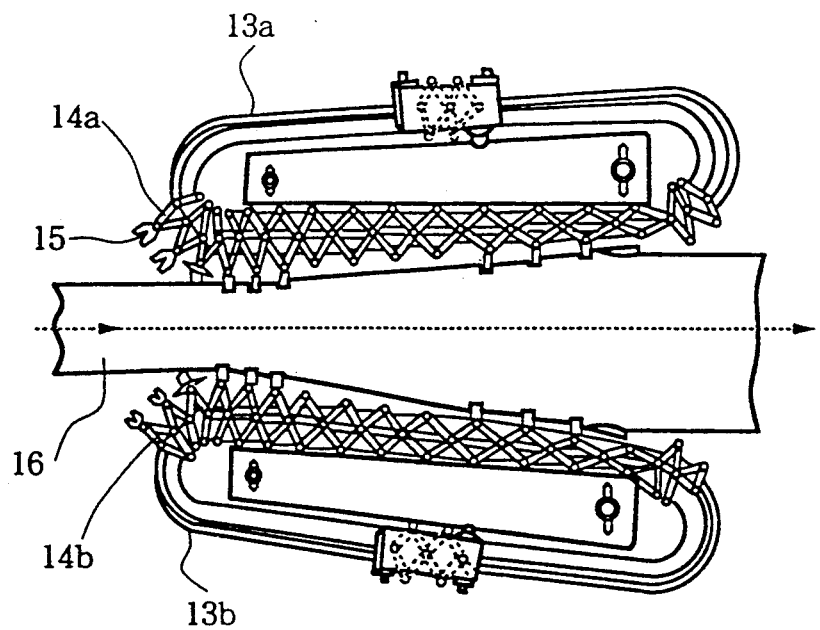
FIG. 3 is a side view showing a gripper type stretch apparatus.

The apparatus shown in FIG. 3 may be used as a lateral stretch apparatus. This lateral stretch apparatus includes pantographs 14a and 14b running on rails 13a and 13b. Each pantograph has a large number of grippers (or grips) 15. The grippers 15 grip both side edge portions of the film 16 and laterally stretch the film 16. In FIG. 3, since the pantographs 14a and 14b are used, stretching operations in the lateral and longitudinal directions ca be simultaneously performed.

Figure 4:
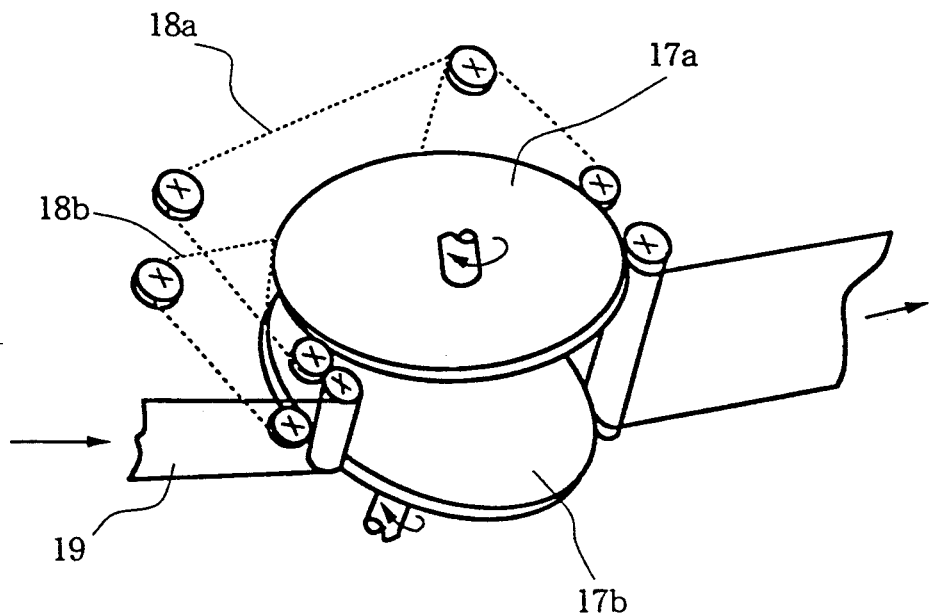
FIG. 4 is a perspective view of a pulley type lateral stretch apparatus.

A pulley type lateral stretch apparatus shown in FIG. 4 may be used as a lateral stretch apparatus. A pair of upper and lower lateral stretch pulleys 17a and 17b are arranged to form an inverted V-shaped spread path. An original roll film 19 is gripped by endless belts 18a and 18b. The original roll film 19 can be stretched by a path having a length corresponding to a half of the circumferential length of each of the pulleys 17a and 17b.

Examples of the article used in wrapping in this embodiment are a large number of cardboard boxes placed on a pallet, a set of articles such as heavy bags, stacked grass, and a roll of paper. Any one of the articles is placed on a turntable.

The shape of an article around which a film is wound is rectangular as in a set of cardboard boxes and a set of heavy bags when viewed from the top. While a film is being wound around a rectangular parallelepiped article, the turntable is rotated at a constant speed. However, the speed at which the film is wound around a corner of the article is different from that at which the film is wound around a side surface of the article. A stretch line may follow a change in running speed of the film. After stretching on the longitudinal stretch line is completed, a dancer roll may be disposed in front of the turntable to absorb the difference in speeds at the corner and the side surface of the article.

When the size of an article is increased or the wrapping speed is increased, a plurality of longitudinal stretch apparatuses and a plurality of lateral stretch apparatuses may be arranged to perform stretch a film by a multi-stage system.

In the first embodiment, the film is used as an original roll. However, other original rolls shown in FIGS. 5A to 11 may be used.

Figure 5A:
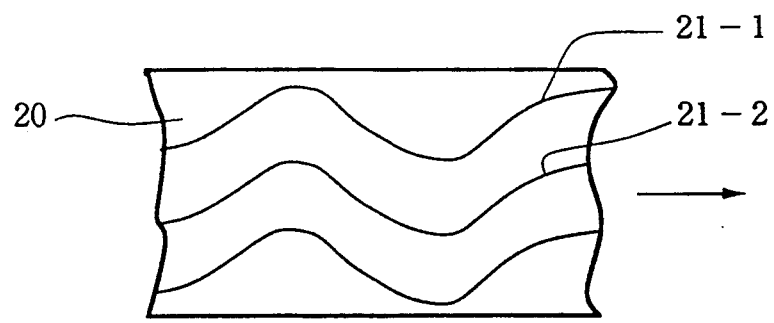
FIGS. 5A to 5C are views showing roll films having different stripe patterns for causing differences in film thicknesses, respectively.
Figure 5B:
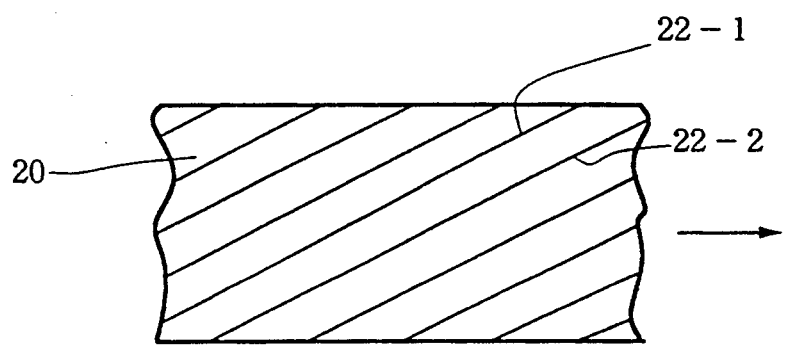
Figure 5C:
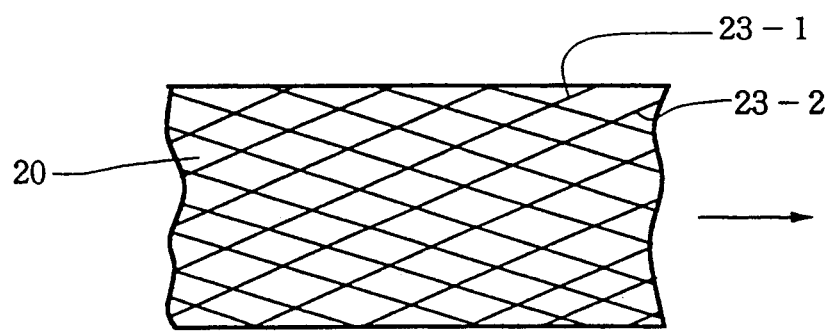

A film having several longitudinal stripes as thick or thin portions to several hundreds of longitudinal stripes within the width of the original roll may be used as an original roll film. FIGS. 5A, 5B, and 5C show original roll films 20 having stripes 21-1, 21-2, ..., 22-1, 22-2, ..., and 23-1, 23-2, ... causing a difference in thickness in the longitudinal direction. The stripes are waved, hatched, or crosshatched to prevent them from serving as skeletons when the corresponding films are rolled. The hatched and crosshatched stripes in FIGS. 5B and 5C can be used when if a longitudinal component is present although it is close to a lateral component.

By using such a film, the thick portion is not subjected to lateral stretching and serves as a stretch film having regular longitudinal stripes. That is, a film which is partially stretched as in a necked film can be obtained. The stretched thin portions can be almost uniformly located in the widthwise direction of the film. These stripes prevents lateral tearing of the film during lateral stretching or in a wrapped film, thereby contributing to manufacturing stability and improvement of product quality.

In a film having longitudinal stripes, the stripes serve as a skeleton to obtain an original roll and may not be a uniform roll. In this case, by using a rotary die during film formation, a winding machine is reciprocated in the right-and-left direction to prevent formation of a skeleton by the stripes. The thickness of the stripe portion is larger than several % or several tens of % of the thickness of a normal portion. When a stripe portion is thick, the width of the stripe is preferably small. When the strip portion is thin, this portion is preferentially stretched, it preferably has a given width.

Figure 6:
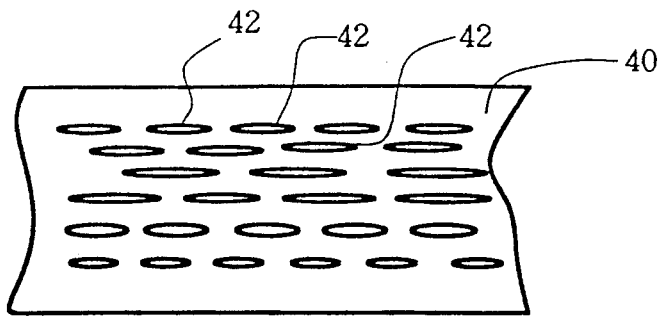
FIGS. 6 to 10 are views showing films used as roll films, respectively.

FIG. 6 shows a perforated film 40 having holes 42. The size and number of holes 42 are determined in consideration of air permeability for a wrapping purpose, a retained tension of a web on an article, and the like. Each hole 42 may be constituted by a slit. In the lateral stretch apparatuses shown in FIGS. 1 to 3, since both the side edge portions of the film are gripped by pins or others, holes are not preferably formed i both the side edge portions of the film 40 but are formed only in the central portion of the film. When holes are not formed in both the side edge portions, the film will not be torn during wrapping or stretching.

When biaxial stretching of the perforated film 40 used as an original roll is biaxially stretched, the holes 42 are increased. The air-permeability density of the film is increased to improve air permeability. The perforated film 40 having the enlarged holes 42 are suitable to wrap an article which requires a high air and moisture permeability and requires prevention of dew condensation, such as vegetables and fruits. This film requires a small number of turns in wrapping and is effective if the number of holes is small. In addition, widthwise shrinkage of the film during stretching is small. Therefore, a wrapped body has a large width, and the wrapping time can be shortened. In addition, the amount of material film is small, cost is low, and an amount of material waste is small.

Figure 7:
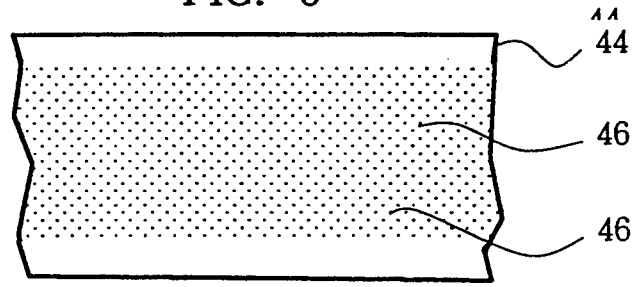
Figure 8:
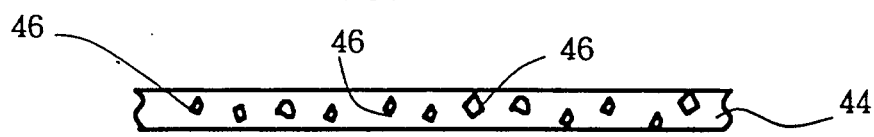

FIG. 7 is a plan view showing a film 44 with an additive. FIG. 8 is a sectional view showing the film 44 with an additive. Reference numeral 46 denotes an additive. The film 44 with the additive is obtained by adding an inorganic powder (filler) and a foaming agent serving as a substantial foreign material in a material polymer during film formation. In the film 44 with the additive, the additive 46 serves as a nucleus to form a hole during stretching or upon stretching. The perforated film 44 has the same effect as the perforated film 40 described above. Examples of the additive for forming a hole are a calcium carbonate powder, a magnesium carbonate powder, a talc powder, a titanium oxide powder, a carbon black powder, a silicon oxide powder, a calcium silicide powder, an aluminum silicide powder, an alumina powder, a kaoline clay powder, a silica powder, a glass powder, and various pigments. These additives are often inorganic powders. However, in order to improve the affinity of a film composition with a polymer, a plasticizer (e.g., dioctyl phthalate or glycerin) or a solvent (e.g., dimethyl sulfoamide) may be used.

Figure 9:
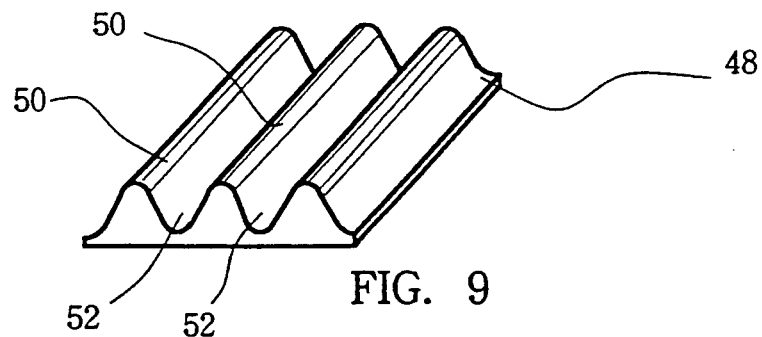
Figure 10:
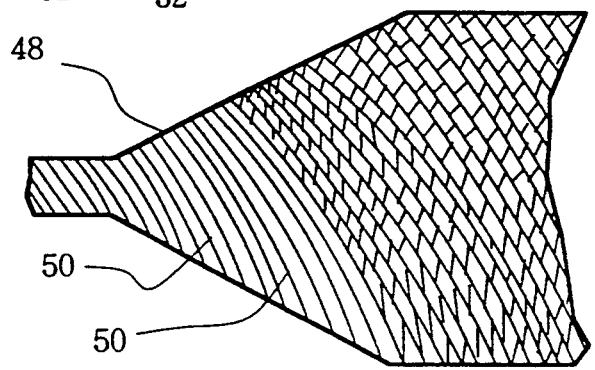

FIG. 9 is a perspective view of a corrugated film 48. The corrugated film 48 is obtained by alternately arranging thick protrusions 50 and thin recessed portions 52. The protrusions 50 and the recessed portions 52 are aligned in a direction to form a predetermined angle with respect to a widthwise direction of the film 48. As shown in FIG. 10, when the corrugated film 48 is laterally stretched in the widthwise direction, some of the recessed portions 52 are torn to form a net. The net-like film 48 has the same effect as in the perforated film 40.

Figure 11A:
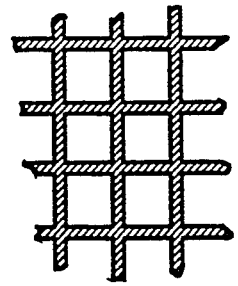
FIGS. 11A and 11B are views showing nets used as original rolls.
Figure 11B:
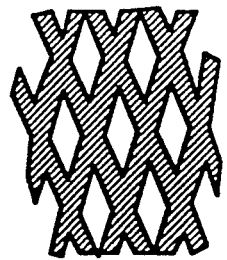

A net may be used in place of a film as a original roll. FIG. 11A shows a matrix net. This net may be used in a combination of longitudinal stretching and lateral stretching. FIG. 11B is a rhombic net having a width illustrated as a slightly increased width. This net does not have any weft components. When warp components of the net are slightly stretched in the widthwise direction to form a rhombic or parallelogram-like shape, the net may be used in a combination of longitudinal stretching and lateral stretching. When a net is used as an original roll, the intersection of the warps may have a thickness larger than that of any other portion. However, any practical problem is not often posed.

A net formed by an integral extrusion method is preferably used as an original roll net. However, a woven filament or tape may be used in place of the net. Although the filament component constituting the original roll net is not stretched or is already stretched, it must be further stretched. The forms of the nets are classified into a matrix net consisting of warp and weft components, and a rhombic net having no weft components but warp or oblique filament components. Since the matrix net has weft components, it cannot be stretched in the widthwise direction. In order to stretch the matrix net in the widthwise direction, lateral stretching must be performed. In any case, an increase in width or lateral stretching is used to perform air-permeable wrapping having a wide width although an original roll net having a small width is used. When the original roll is not a rhombic net, it is used in a combination of longitudinal stretching and an increase in width. Longitudinal stretching or an increase in width may be performed first. Alternatively, an increase in width may be performed during stretching. Since the rhombic net does not have any weft components, all the components of the net can be almost stretched by longitudinal stretching, and an increase in width is also facilitated. Alternatively, lateral stretching of a rhombic net is performed, and an increase in width and slight stretching of the constituting filaments can be performed. Methods used in film stretching and an increase in width of the film may be used as net stretch means and a net width increasing means. Net stretch means are disclosed in Japanese Patent Laid-Open Nos. Sho 62-97825 and 62-97829 proposed by the present inventors.

Figure 12:
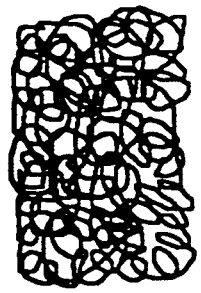
FIG. 12 is a view showing an unwoven fabric used as a roll.

An uneven fabric may be used in place of a film as an original roll. FIG. 12 is an uneven fabric obtained by entangling, embossing, or adhesion of a large number of filaments. These filaments can be used in a combination of longitudinal stretching, lateral stretching, and an increase in width. An uneven fabric may be one consisting of random filaments such as a spun bond uneven fabric. However, one-directional aligned filament of an nonaligned filament is particularly suitable for this purpose. Such an unwoven fabric is stretched in at least one direction to retain or hold an article by a shrinkage tension caused by stretching. Methods used in film stretching and an increase in width of the film may also be used as an unwoven fabric stretch means and an unwoven fabric width increasing means. A special perforating unit need not be used in unwoven fabric wrapping. When the unwoven fabric is used, the same effect as in formation of a large number of apertures can be obtained, and the outer appearance of wrapping can be aesthetically improved.

Figure 13:
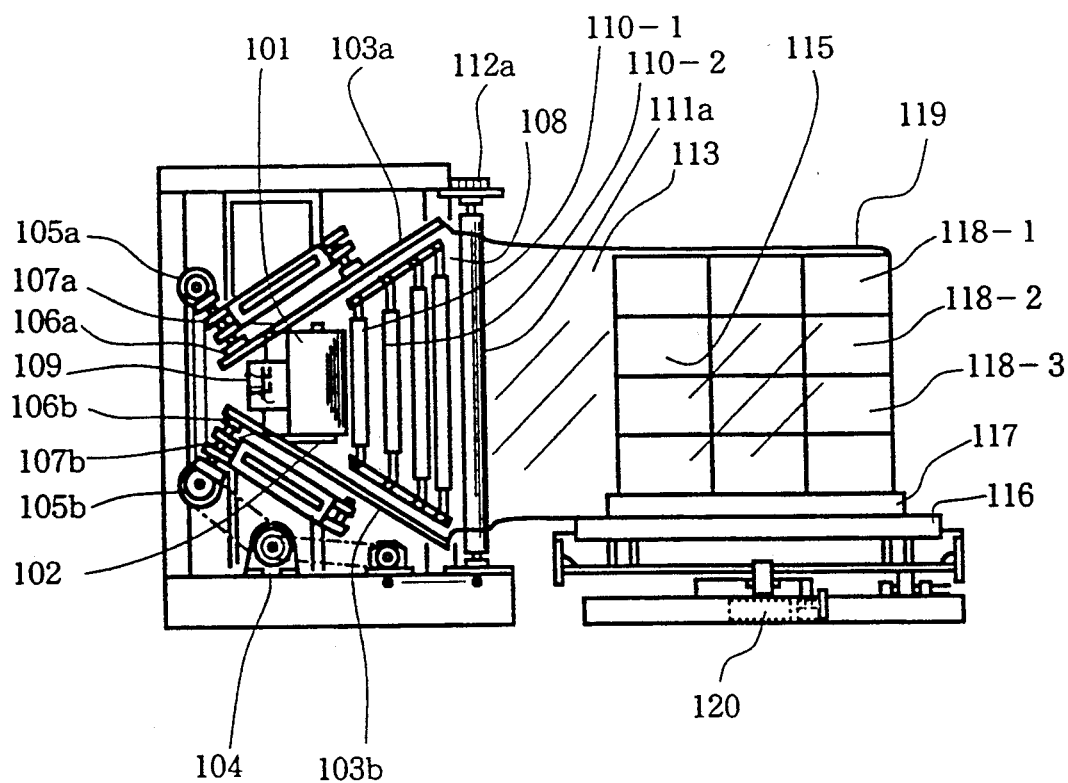
FIG. 13 is a side view showing a wrapping apparatus according to a second embodiment of the present invention.
Figure 14:
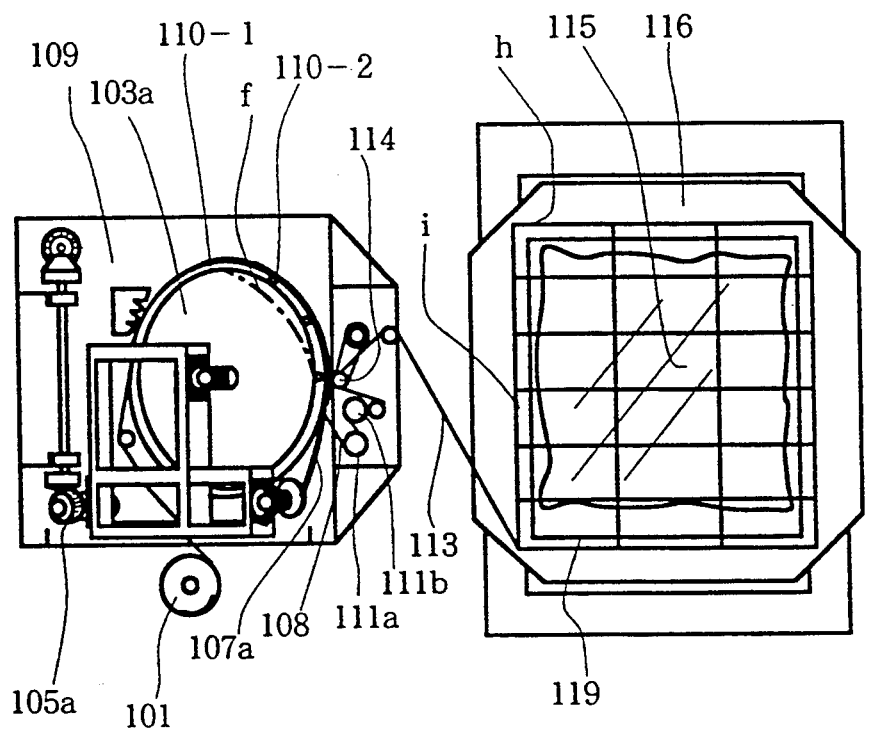
FIG. 14 is a plan view showing the apparatus shown in FIG. 13.
Figure 15:
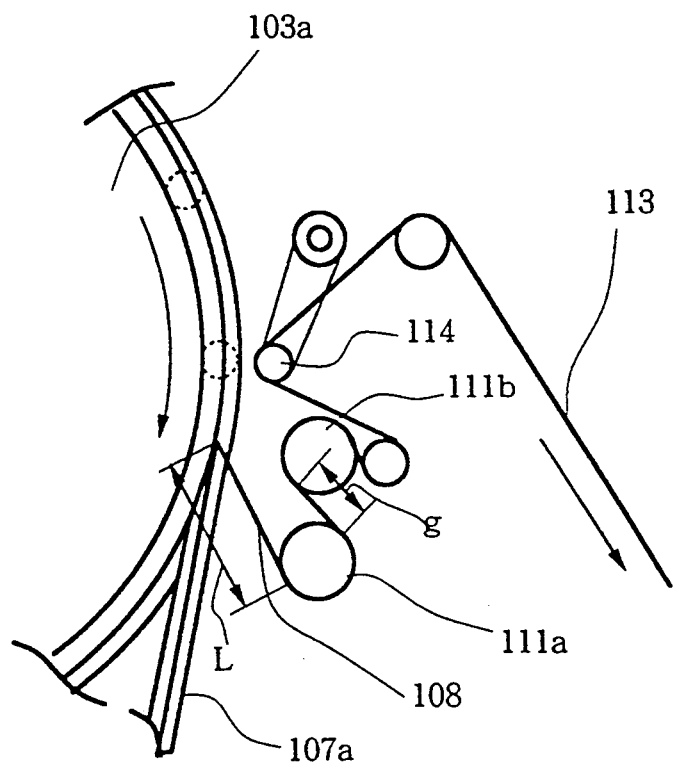
FIG. 15 is an enlarged view showing a longitudinal stretch unit in the apparatus shown in FIG. 13.

The second embodiment and its modifications of the present invention will be described with reference to FIGS. 13 to 26B. FIG. 13 is a side view of this embodiment, and FIG. 14 is a plan view thereof. An original roll film 101 (film width w1) in the form of a roll is placed upright. The film is supplied with an almost predetermined tension (supply speed v1) and is guided to upper and lower stretch pulleys 103a and 103b. A table 102 on which the original roll film stands upright is illustrated outside the frame of the apparatus in FIG. 14, but can be stored within the frame upon rotation of an inner support point (not shown) which supports the table 102 after the original roll film is set. The direction of rotation of a drive unit 104 is changed by bevel gears 105a and 105b to rotate turn pulleys 106a and 106b. Belts 107a and 107b are driven by the turn pulleys 106a and 106b. The stretch pulleys 103a and 103b are rotated by these belts (speed v2). The film may be slightly stretched by a supply tension and may be then fed to the stretch pulleys. (v1 < v2).

Both side edge portions of the original roll film 101 are gripped by the endless belts 107a and 107b at a portion where distance between the stretch pulleys 103a and 103b is the smallest. The distance between the gripped side edge portions of the film is defined as w2. The film whose both side edge portions are gripped by the belts 107a and 107b is stretched in the widthwise direction along a spread path defined by the halves of the peripheries of the stretch pulleys 103a and 103b. The stretched film is released from the belts and pulleys at a portion where the distance between the pulleys is the largest (the distance between the gripped side edge portions of the film is defined as w3). The released film serves as a laterally stretched film 108 (overall film width W4). During lateral stretching, heating is not generally required. When the diameter of each stretch pulley cannot be assured to be sufficiently large, the locus of the film running along the central portion is shorter than that along the pulleys. For this reason, a nonstretched portion is left in the central portion of the film. In pallet wrapping, slight variations in stretching do not pose any problem. However, when a nonstretched central portion is left conspicuously, the central portion of the film can be heated by an infrared heater 109 to perform uniform stretching during an initial period of stretching. During lateral stretching, the shrinkage force acts on the central film portion in the longitudinal direction when the stretch magnification is increased. The central film portion is suspended, as indicated by the alternate long and two short dashed curve f in FIG. 14. When this suspension as indicated by the curve f extremely occurs, the central portion is not stretched to result in nonuniform stretching. In order to prevent this, rotatable guide turn rolls 110-1, 110-2, 110-3, ... are arranged so that each of their diameters is set almost equal to the outer diameter of each of the stretch pulleys 103a and 103b, thereby preventing the suspension indicated by the curve f and performing uniform stretching.

Two longitudinal stretch rolls 111a and 111b are set upright near the maximum spread portion defined by the lateral stretch pulleys 103a and 103b, respectively. A separate nip roll may be mounted on the longitudinal stretch roll 111b to keep the stretch tension. The roll 111b is driven by a line shaft by a drive unit 4. The difference between a surface speed (v3) of the roll 111a and the surface speed (v4) of the roll 111b is determined by a gear ratio of gears 112a and 112b (although not shown in FIGS. 14 and 15). A film 113 longitudinally stretched by the rolls 111a and 111b is wound around a cargo 115 at a speed v5 with a predetermined tension by a tension control dancer roll 114. The predetermined tension can be controlled by an electrical or mechanical tension controller, or a mechanism for obtaining the predetermined tension such that motion of the dancer roll is controlled by an air cylinder and a spring or a magnet.

The cargo 115 obtained by stacking articles (118-1, 118-2, 118-3, . . . ) is placed on a pallet 117 on a turntable 116. An upper contact film 119 is placed on the upper surface of the cargo 115. The turntable 116 is driven by a motor 120. The cargo 115 is entirely wrapped by winding the film 113 around all the side surfaces of the cargo 115.

Although not shown, a unit for urging a free rotation surface against the upper surface of the cargo to prevent misalignment of the cargo regardless of its rotation may be used.

The turntable 116 is rotated at a predetermined speed. Since the cargo 115 has a rectangular parallelepiped shape, the speed at which the film 113 is wound around a corner portion h is different from (higher than) that at which the film 113 is wound around a flat portion i. A change in speed (i.e., a change in tension) can be absorbed by movement of the dancer roll 114. For example, when the initial speed of the turntable is set low, and the speed of the turntable is gradually increased, and when a change in speed cannot be absorbed by only the dancer roll, the position of the dancer roll is detected to change the speed of the drive unit 104, thereby absorbing the change in speed. Another method may be employed to control the drive unit 120 for the turntable 116 so that the speed at the portion h of the cargo is set almost equal to that of the portion i. Alternatively, rotation of the turntable may be easily controlled by a torque motor.

When the width of a stretched film is smaller than the height of a cargo, the cargo on the turntable may be vertically moved and is wound with the stretched film, thereby wrapping all the side surfaces of the cargo with the film. Alternatively, the stretch apparatus may be vertically moved as a whole. It is easier to arrange a mechanism for vertically moving the turntable than to arrange a mechanism for vertically moving the entire stretch apparatus.

The film stretch magnification can be defined as follows.

An apparatus lateral stretch magnification Nm and a substantial lateral stretch magnification Np as an overall width of the film are given as follows:

Apparatus Lateral Stretch Magnification
$Nm = w3/w2$

Substantial Lateral Stretch Magnification
$Np = w4/w1$ where w1 is the width of the original roll, w2 is the width between the gripped side edge portions of the film at the pulley inlets, w3 is the width between the gripped side edge portions of the film at the pulley outlets, and w4 is the width of the film wound around the article.

A longitudinal stretch magnification Mr of the apparatus roll and a substantial longitudinal stretch magnification Mp from supply of the film to its winding around the article are defined as follows:

$Mr = v4/v3$ $Mp = v5/v1$ where v1 is the film supply speed, v3 and v4 are surface speeds of the longitudinal stretch rolls, and v5 is the speed of winding the film around the article.

A total area stretch magnification X can be given as follows:

$$X = Mp/Np$$
$$= (w4 \times v5)/(w1 \times v1)$$

This second embodiment covers an easy-to-handle stretch apparatus capable of effectively increasing the area stretch magnification X. As an effective means for this purpose, the longitudinal stretch rolls are located near the lateral stretch apparatus. The longitudinal stretch means comprises an proximal stretch means in which rolls are close to each other. In order to further clarify this, the longitudinal stretch apparatus in FIG. 14 is enlarged and illustrated in FIG. 15. When the distance L between the lateral stretch apparatus and the longitudinal stretch apparatus is made small, longitudinal stretching can be performed between them. It is, however, effective to perform proximal longitudinal stretching within a distance g between the longitudinal stretch rolls. With this arrangement, longitudinal stretching is performed while widthwise shrinkage of the film in the lateral direction can be minimized. An easy-to-handle stretch means for maximizing the area stretch magnification X by a small lateral stretch magnification Mp and a large longitudinal stretch magnification Mp can be obtained. In this case, the lateral stretch magnification Np must be sufficient to stretch the film to have a width larger than the height of the article so as to cover all the side surfaces of the cargo 115 by using the given original roll film width w1. The distance L must be minimized and preferably 800 mm or less, and more preferably 200 mm or less. When the distance L is set to be 800 mm or less, the widthwise shrinkage of the film upon lateral stretching can fall within the range of 10 to 20% (depending on different types of films). When the distance L is set to be 200 mm or less, the shrinkage ratio can be set to be 10% or less. When the distance L exceeds 800 mm, the shrinkage ratio exceeds 20% to degrade lateral stretch efficiency.

Longitudinal stretching may be performed between the longitudinal stretch roll 111a and the lateral stretch pulleys 103a and 103b. However, the widthwise shrinkage ratio is smaller in longitudinal stretching between the rolls 111a and 111b capable of reducing the longitudinal stretch distance g than in longitudinal stretching between the longitudinal stretch roll 111a and the lateral stretch pulleys 103a and 103b. The stretch distance g is preferably set small. If the stretch distance g is, however, excessively small, workability in initial film setup and removal of the film from a roll is degraded. Therefore, the g value is set to be 200 mm or less, and preferably 50 mm to 5 mm.

One of the characteristic features of the second embodiment is that the stretch magnification can be changed when the height of the cargo 115 is changed. Therefore, the winding film width w5 can be controlled to be larger than the height of the cargo but not to be excessively larger than that, thereby preventing waste of the film. The stretch magnification can be easily changed by changing the gripping positions at the inlets or outlets of the pulleys. or the like. This flexibility is inherent to such an easy-to-handle lateral stretch apparatus.

Figure 16:
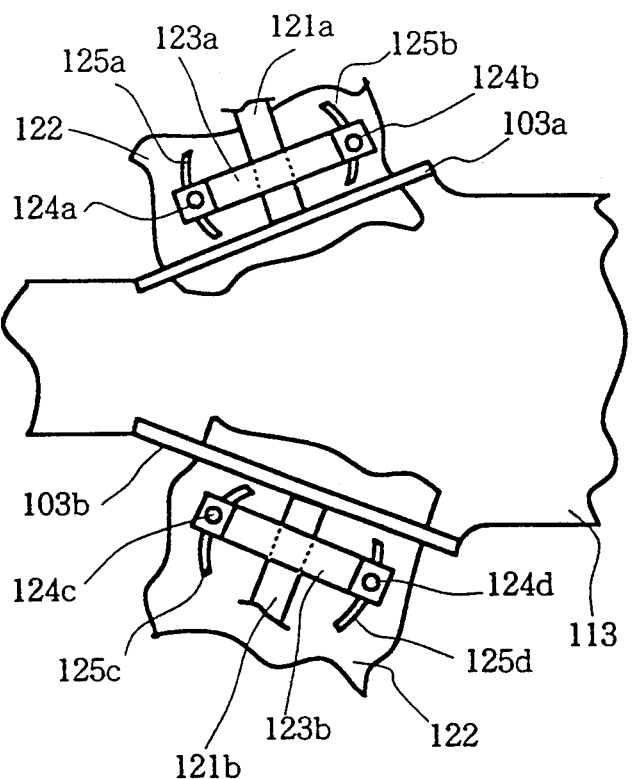
FIG. 16 is a side view showing a mechanism for changing a lateral stretch magnification.

FIG. 16 shows a mechanism for changing the lateral stretch magnification in this embodiment. Shafts 121a and 121b of the pulleys 103a and 103b are rotatably supported on bearings 123a and 123b, respectively. Arcuated elongated holes 125a to 125d are formed in a frame 122. The bearings 123a and 123b are fixed on the frame 122 by bolts 124a to 124d respectively extending through the elongated holes 125a to 125d. When the bolts 124a and 124d are loosened, they are moved along the elongated holes 125a to 125d, and tightened again to change the angles of the bearings 123a and 123b. Therefore, the angles of the shafts 121a and 121b can be changed to change the open angle between the pulleys 103a and 103b, thereby changing a stretch magnification.

Figure 17:
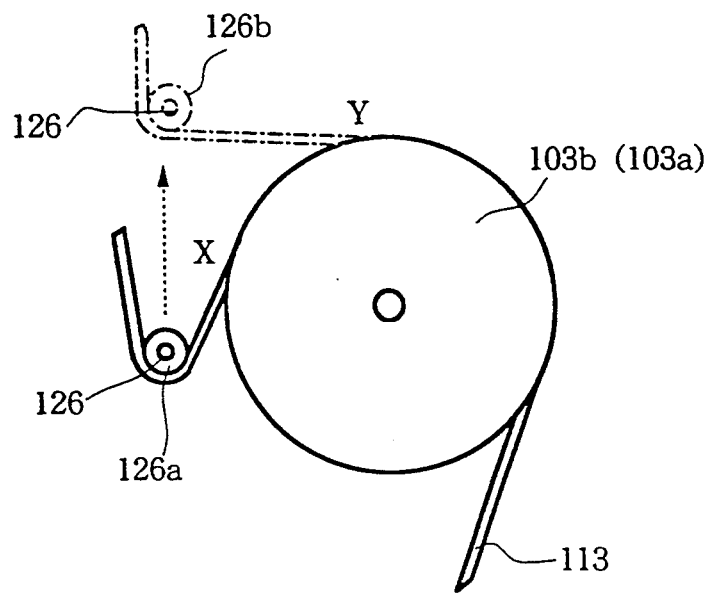
FIG. 17 is a view showing another mechanism for changing a lateral stretch magnification.

The stretch magnification change mechanism is not limited to that shown in FIG. 16. FIG. 17 shows another arrangement for changing the film stretch magnification. A roller 126 located immediately before a film is supplied to the pulleys 103a and 103b and is movable. For example, when the roller 126 is moved from position 126a to a position 126b, the position of the pulleys 103a and 103b which grip the film is changed from position X to a position Y. Therefore, the film stretch magnification can be changed.

Figures 18A, 18B, 18C:
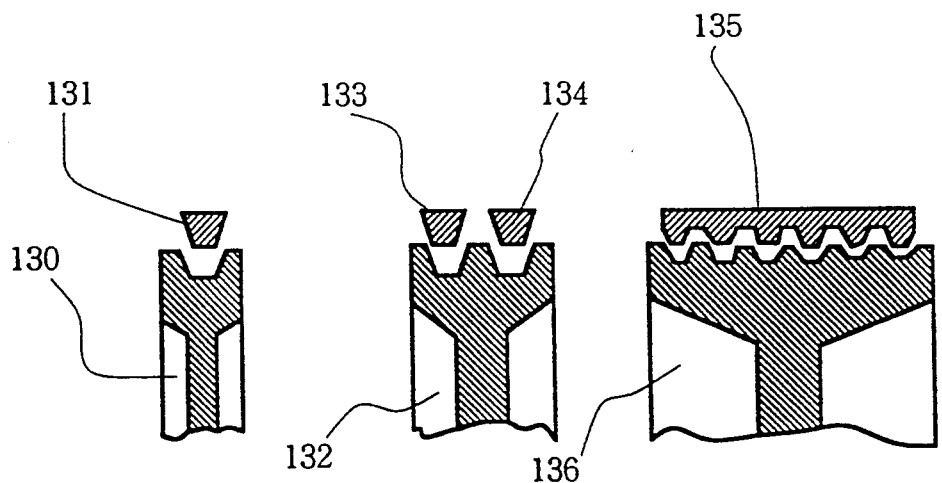
FIGS. 18A to 18C are views showing different types of stretch pulleys, respectively.

The stretch pulley and the mating belt generally comprise a V-pulley 130 and a mating V-belt 131 (a two-sided V-belt may be used), respectively, as shown in FIG. 18A. However, the shape of the belt is not limited if it can be fitted in a groove. A pulley 132 having a plurality of grooves shown in FIG. 18B may be used, and a plurality of belts (133 and 134) may be fitted in these grooves. This arrangement is effective for a film having a large stretch tension. When a film has a small stretch tension, a flat belt and a flat pulley may be used. As shown in FIG. 18C, projections may be formed on a flat belt 135 and a flat pulley 136 to effectively increase a gripping force.

Figure 19:
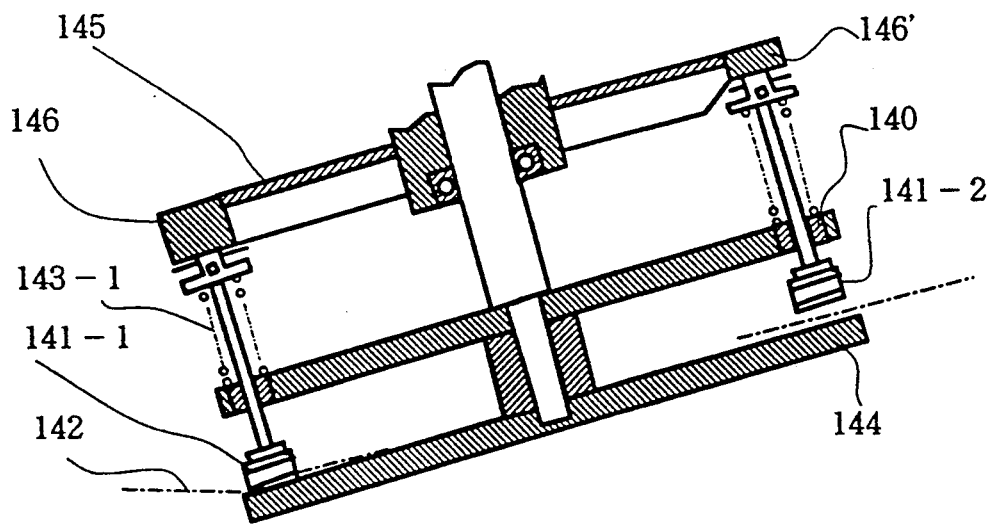
FIG. 19 is a sectional view showing a gripper type lateral stretch rotary disc.

FIG. 19 shows another arrangement of a lateral stretch rotary disc. A lateral stretch disc obtained by forming a large number of press members 141-1, . . . , 141-n in the peripheral portion of such a disc 140 may also be used. Referring to FIG. 19, the press member 141-1 is urged by a spring 143-1 to grip a film 142 with a lower disc 144. A fixed bottom plate 145 is mounted on this disc. When the length of a rib 146 formed on the peripheral portion of the bottom plate 145 is larger, the film can be gripped by the behavior of the spring. At a position where the film is released, the rib is short, as indicated by a rib 146', so it does not receive the biasing force of the spring. In this arrangement, although the spring is used, gripping can be performed by using a pneumatic force produced by an air cylinder, as disclosed in Japanese Patent Publication No. Sho 63-44049.

Figures 20, 21:
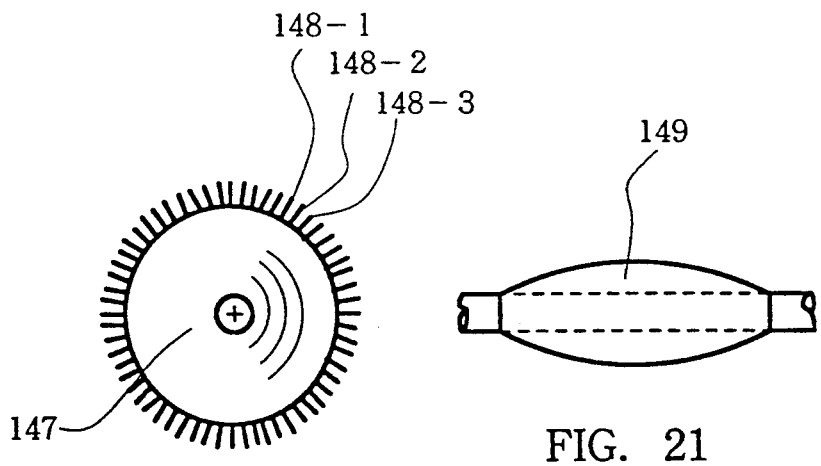
FIG. 20 is a view showing a structure in which a large number of needle-like pins planted in the peripheral portion of the lateral stretch rotary disc.
FIG. 21 is a view showing a barrel roll as a guide turn roll.

FIG. 20 shows another disc. This disc is a lateral stretch disc obtained by forming a large number of needle-like pins 148-1, 148-2, 148-3, . . . on the circumferential surface of a disc 147. These pins are hooked by both side edge portions of a film to vertically stretch the film along a spread path defined by the upper and lower discs.

The lateral stretch mechanisms using the discs according to this embodiment are simple. By using each mechanism described above, loci of both the side edge portions of the film along the discs are longer than those of the central portions of the discs, and the central portion of the film is inevitably made thick. When the diameter of the disc is increased, the difference in thickness can be reduced. However, a large disc is not suitable for an easy-to-handle lateral stretch apparatus. In order to reduce the above stroke difference, some of the guide turn rolls 110-1, 110-2, . . . , which are flat in FIGS. 13 and 14, ar replaced with barrel rolls 149 shown in FIG. 21. The central portion of the barrel roll 149 extends outside the outer periphery of the disc to reduce this stroke difference.

Figure 22:
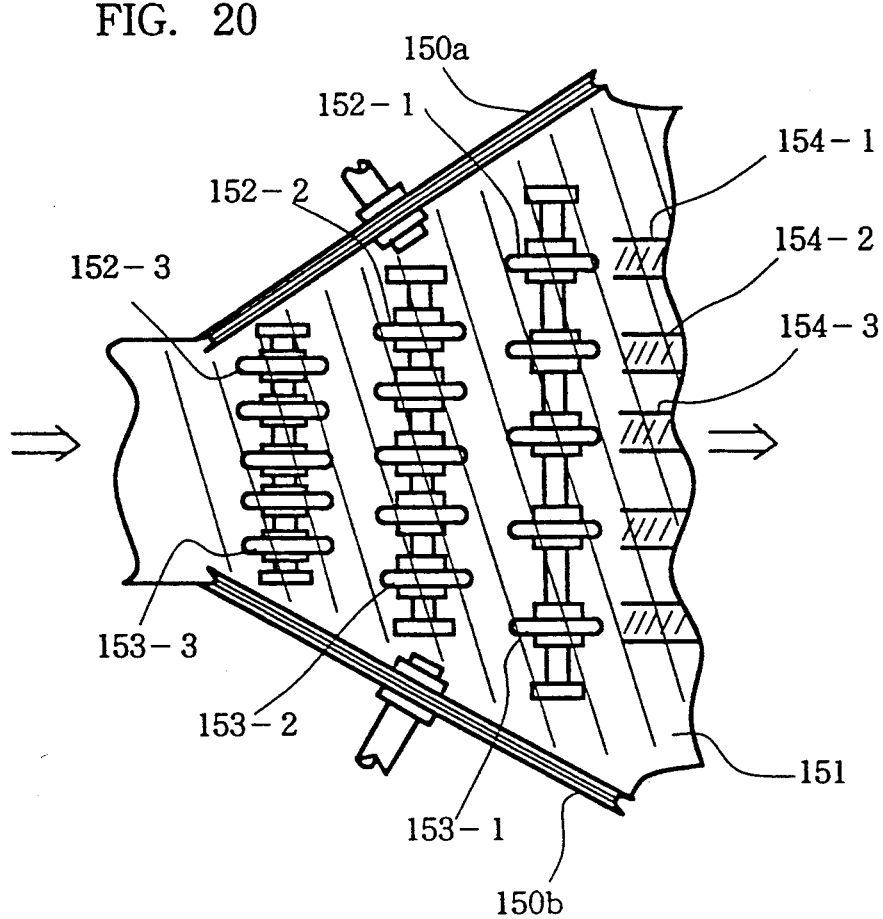
FIG. 22 is a view showing a structure in which a large number of guide rolls are mounted on the turn rolls.

When a stretch film is laterally stretched, forming necks is performed so that nonstretched portions are left in the form of stripes No practical problem is posed in stretch wrapping even if some nonstretched portions are left in the film. When the nonstretched portions are localized, a binding force distribution on the article becomes nonuniform, thus posing a problem. In order to solve this problem, ring-like guide rolls 153-1, 153-2, 153-3, . . . are arranged in the spread path defined by the lateral stretch discs 150a and 150b shown in FIG. 22. These ring-like guide rolls 153-1, 153-2, 153-3, . . . are arranged in guide turn rolls 152-1, 152-2, and 153-3 for guiding the film 151 to be laterally stretched and are aligned along the spread stretch path. With this arrangement, nonstretched portions 154-1, 154-2, 154-3, . . . of a laterally stretched film 151 are spread throughout the film and are almost uniformly distributed. In the arrangement of FIG. 22, although the diameters of all the guide rolls are identical, the diameters of central rolls are set to be larger than those of end rollers close to the stretch discs, so as to obtain the same effect as in the barrel rolls in FIG. 21.

Figure 23:
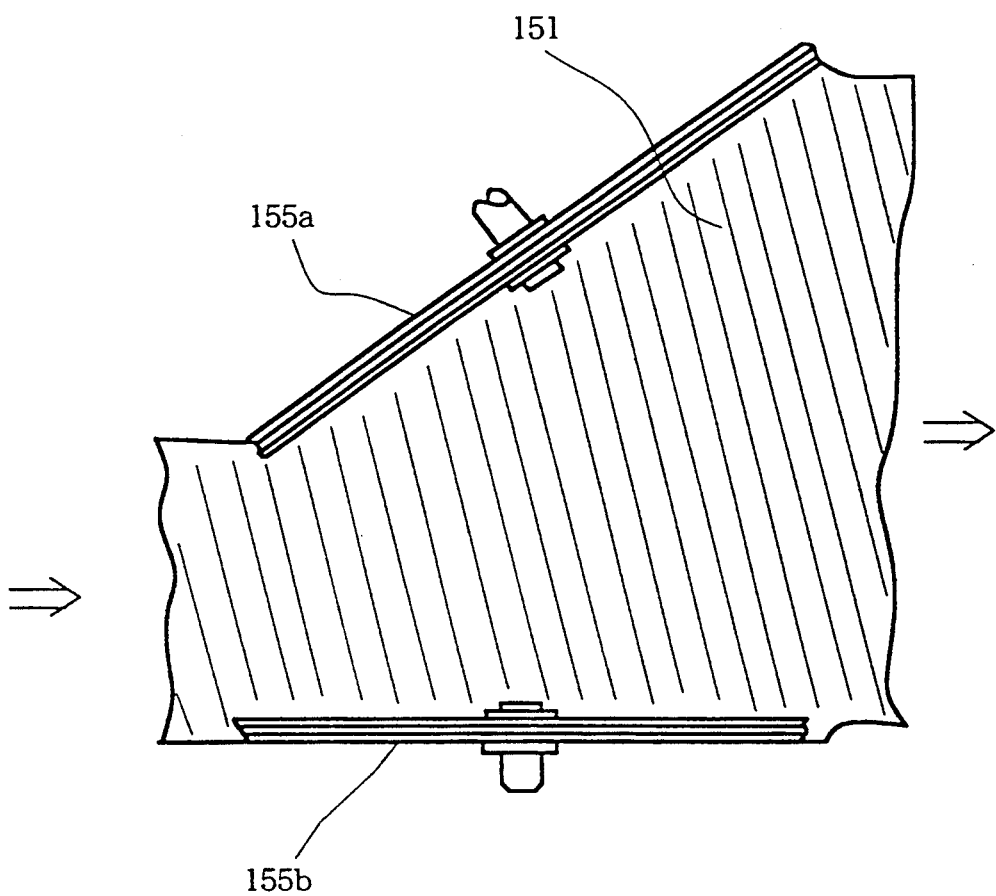
FIG. 23 is a view showing a structure in which lateral stretch rotary discs having different diameters are asymmetrically disposed.

The pair of upper and lower lateral stretch rotary discs are symmetrical with each other about a disc having the same diameter in FIGS. 13 and 14. However, these upper and lower discs ma be discs having different diameters and arranged asymmetrically, as shown in FIG. 23. A lower disc 155b is disposed parallel to the ground surface, and an upper disc 155a is inclined from the ground surface. The upper disc 155a has a larger diameter than that of the lower disc 155b. With this arrangement, a heavy original roll film can be located at a lower position. When the stretch magnification is to be changed, only the inclination angle of the disc 155a is changed without moving the position of the original roll or the disc 155b.

The laterally stretched film has large widthwise shrinkage immediately after lateral stretching or during longitudinal stretching after lateral stretching. In this case, in order to reduce shrinkage, an appropriate width increasing means (widthwise shrinkage preventing means) can be preferably arranged immediately after lateral stretching, during longitudinal stretching, or before or after longitudinal stretching. FIG. 24 shows a conical member which is the widthwise shrinkage preventing means arranged at the outlet of the lateral stretch apparatus. An original roll 160 comprises a net. This net 160 is hooked and gripped by a large number of pins 162 formed on the circumferential surfaces of pin type lateral stretch discs (the discs are as shown in FIG. 19) located in the inverted V-shaped spread path and is then laterally stretched, thereby obtaining a laterally stretched net 163 A turn roll 164 (this roll may be freely rotated or driven) is located at the outlet of the lateral stretch disc. Conical members (i.e., tapered rotary members) 165a and 165b each having a frustoconical shape ar located at positions where both end side edge portions of the film on the surface of the turn roll 164 reach. Each conical member may be freely rotated by inserting a bearing therein, or may be fixed on the turn roll 164 and can be rotated together with the turn roll 164. The conical members 165a and 165b are arranged such that large-diameter portions are directed toward the side edge portions of the film. The turn roll 164 may be constituted by the first one of the longitudinal stretch rolls. The conical members 165a and 165b effectively prevent widthwise shrinkage of the film and can actually prevent widthwise shrinkage by about 10%. FIG. 24 exemplifies the pin type rotary discs and the net. The same effect as described above can be obtained by using other stretch rotary discs and other films. Note that normal expander rolls, cross guiders, or arcuated bars may be used in place of the conical members 165a and 165b.

FIGS. 25A and 25B show another widthwise shrinkage preventing means. FIG. 25A shows a large number of conical members 167 of a frustoconical shape mounted on an arcuated bar 166. A bearing is mounted in each conical member 167, and the conical member 167 can be freely rotated. The arcuated direction o the bar 166 corresponds to a direction to cause the film to flow, as indicated by an arrow in FIG. 25A. FIG. 25B is a sectional view of one conical member 167. A bearing 168 is mounted in the conical member 167. Although the widthwise shrinkage preventing means shown in FIG. 24 and FIGS. 25A and 25B are effectively disposed immediately after lateral stretching as shown in FIG. 23, as described above, they can be arranged immediately after longitudinal stretching to obtain a sufficient shrinkage preventing effect because the lateral stretch discs are located near the longitudinal stretch rolls.

Figure 26A:
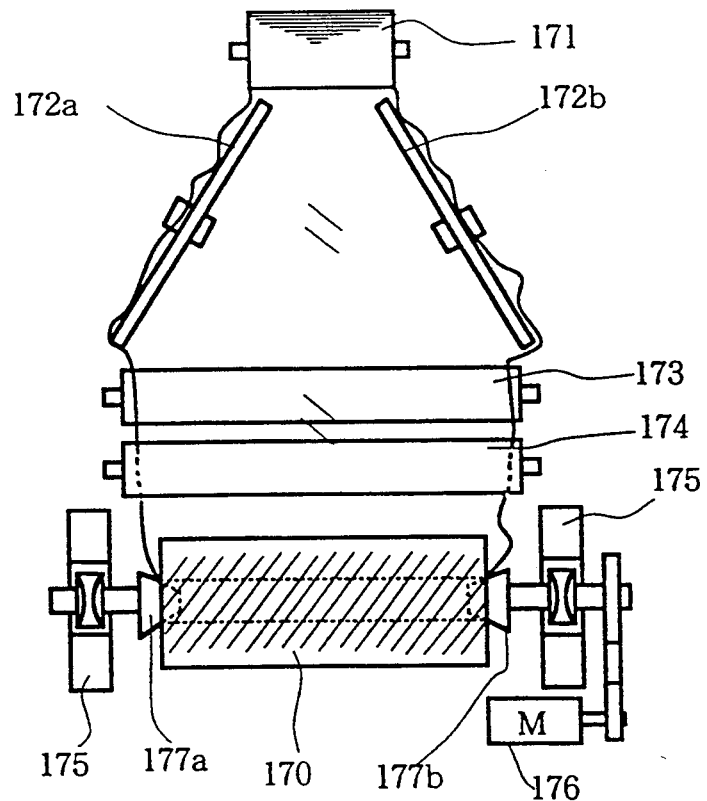
FIGS. 26A and 26B are views showing a cylindrical wrapping apparatus.
Figure 26B:
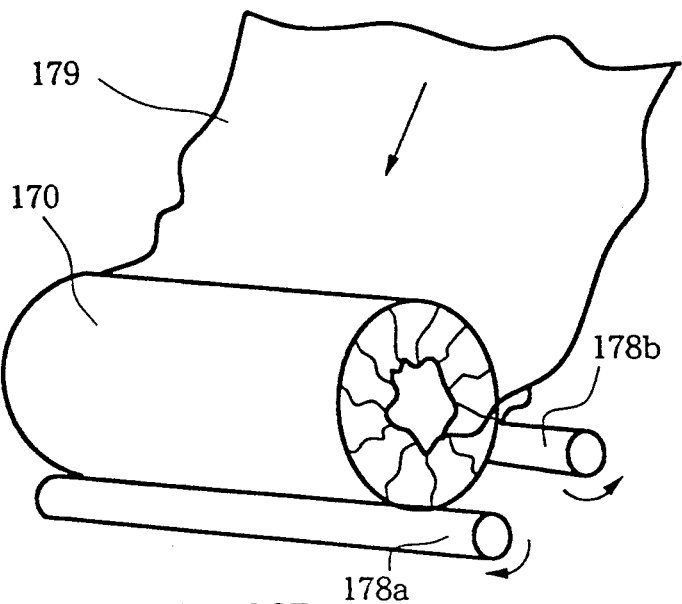

As opposed to lateral stretching of the film in the vertical direction, as shown in FIGS. 13 and 14, the film may be horizontally located, and lateral stretching may be performed to wrap an article with the film. This is illustrated as an apparatus in FIGS. 26A and 26B. More specifically, this apparatus wraps a roll article 170. The article is rotated about a core, and a stretch film is wound around the surface of the article, thereby wrapping the article. FIG. 26A is a plan view of the wrapping apparatus for the roll article 170. The original roll 171 is laterally stretched by stretch rotary discs 172a and 172b (these are simplified for the sake of illustrative convenience, and may be stretch rotary discs each consisting of a pulley and a belt in FIG. 13, gripper type discs in FIG. 19, or the stretch rotary discs each having a large number pins extending on its circumferential surface in FIG. 20). The laterally stretched film is longitudinally stretched between longitudinal stretch rolls 173 and 174. The article 170 is supported by a coupling 177b rotated by a motor 176 arranged on a table 175 and a free rotation coupling 177a having a bearing therein. A stretch film is wound around the article 170. FIG. 26A shows a center drive winding method, and FIG. 26B shows a surface drive winding unit. The roll article 170 is placed on rolls 178a and 178b. At least one of the rolls 178a and 178b is rotated by driving. Upon rotation of the rolls, the article 170 is rotated, and a stretch film 179 is wound around the article 170. A belt may be looped between the rolls 178a and 178b to wrap a spherical or cylindrical article (e.g., grass) on the belt. Wrapping of the articles by using a turntable or a central or surface drive scheme is known well to those skilled in the art. When this wrapping is combined with the lateral stretch apparatus of the present invention, the film width can be increased, and the number of turns can be reduced. In addition, the amount of film used can be largely reduced, and the time and the resource can be reduced.

The disc type stretch apparatus serving as a lateral stretch apparatus of this embodiment can stereoscopically use the space. For this reason, the apparatus can be made compact, and the installation floor area can be reduced. Since the film can be stretched with both the side edge portion being gripped, the stretch magnification can be increased, and stretching can be properly performed. Since the apparatus can be easy to use, the apparatus cost is low. In particular, in a pulley type stretch apparatus, since commercially available pulleys and belts can be used, operations are simple and the apparatus is inexpensive. Since the apparatus is easy to use, a stretch magnification can be changed in accordance with the height of the article, and workability in repair and transportation of the apparatus can be improved.

Another characteristic feature of the disc type lateral stretch apparatus is to provide the following functions by a combination of a pair of discs although the stretch apparatus is easy to handle.

(a) Parallel portions not subjected to lateral stretching are present at the inlets of the discs, and these portions are used to preheat the film.

(b) The film can be laterally stretched by the subsequent spread path.

(c) Parallel portions are also present at the end of stretching, and alignment of the molecules in the stretched state is stabilized in these parallel portions (heating is stabilized in a heated state).

(d) When both the side edge portions are kept gripped passing through a maximum stretch portion, the width of the film is then reduced. When the film is kept gripped until this area, the film is kept gripped in a slightly shrunk state, so that film shrinkage can be reduced after the film is released from the discs (shrinkage heating is performed in a heated state).

(e) The position at which the film is gripped at the inlets of the discs and the position where the laterally stretched film is released at the outlets of the discs are changed to change a stretch magnification.

The preferable range of the lateral stretch magnification in the second embodiment is the same as that in the first embodiment. The film is stretched to have a width larger than the height of the article and can wrap almost all the side surfaces of the article by one turn, as in the first embodiment.

When the height of an article is very large and all the side surfaces of the article cannot be wrapped with the film by one turn, a lift device may be mounted on the turntable to vertically move the article while being rotated, thereby wrapping the article with the film.

In the second embodiment, either longitudinal stretching or lateral stretching may be performed first as in the first embodiment. Longitudinal stretching, however, is preferably performed after lateral stretching is performed due to the same reason as in the first embodiment. As a longitudinal stretch apparatus, a stretch apparatus having a simultaneously biaxial mechanism for laterally stretching the film in the disc type lateral stretch apparatus may be used (Japanese Patent Publication No. Sho 46-15438).

A plurality of longitudinal stretch apparatuses and a plurality of lateral stretch apparatuses may be arranged to stretch a film by a multi-stage system.

A polymer used as an original roll film in this embodiment is the same as exemplified in the first embodiment. Articles to be wrapped in this embodiment are also the same as those in the first embodiment.

According to the second embodiment, the same effect as in the first embodiment can be obtained. In particular, since the lateral stretch apparatus is an easy-to-handle disc type lateral stretch apparatus, the apparatus cost is low, the installation space is small, and workability can be improved.

The second embodiment described above exemplifies a film as an original roll. However, other original rolls shown in FIGS. 6 to 11 may be used. The same effects in use of these original rolls as in the first embodiment can be obtained.

Figure 27:
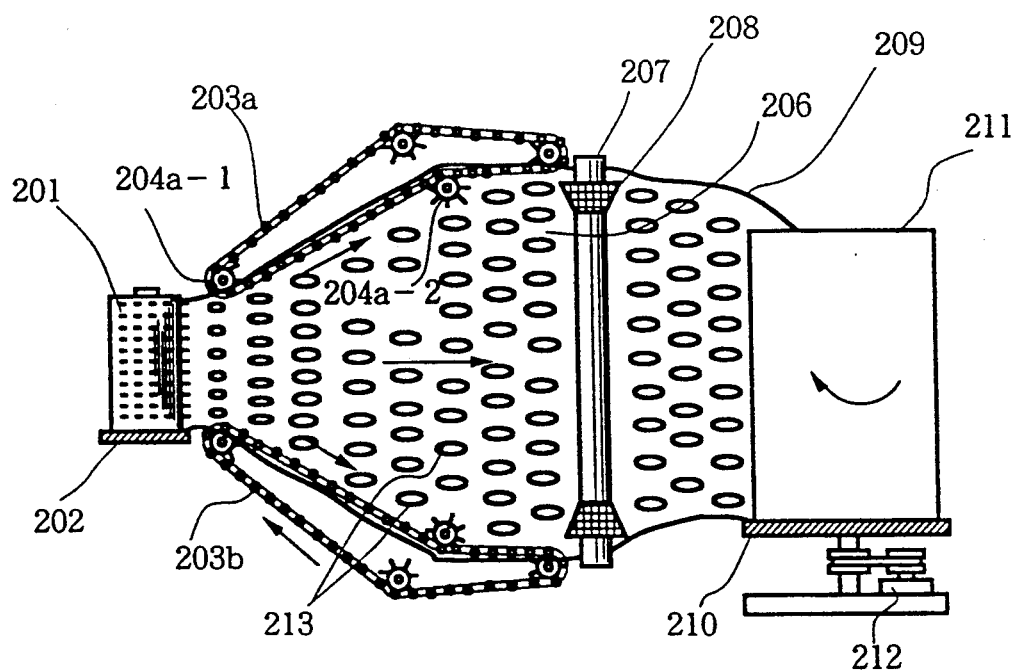
FIG. 27 is a side view showing a wrapping apparatus according to a third embodiment of the present invention.
Figure 28:
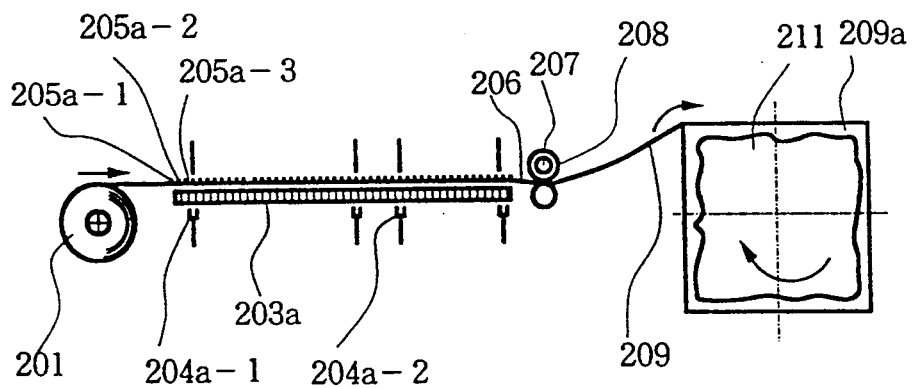
FIG. 28 is a plan view of the apparatus shown in FIG. 27.

The third embodiment of the present invention will be described with reference to FIGS. 27 and 28. FIGS. 27 and 28 show a wrapping system using a portable pin tenter lateral stretching apparatus, in which FIG. 27 is a side view thereof, and FIG. 28 is a plan view thereof. An original roll 201 in the form of a roll stands upright on a table 202. This original roll is a perforated film. The width of the original roll is smaller than the height of an article 211. Reference numerals 213 denote holes formed in the film. Upper and lower chains 203a and 203b are guided by chain wheels 204a-1, 204a-2, . . . . A large number of needle-like pins 205a-1, 205a-2, 205a-3, . . . (to be briefly described as pins 205 hereinafter) extend on the chains 203a and 203b. The chains 203a and 203b, the chain wheels 204a-1, 204a-2, . . . , and the pins 205 constitute a pin tenter lateral stretch apparatus. A combination of the chain and the chain wheel can be replaced with a combination of a belt and a pulley. Both side edge portions of the perforated film 201 are hooked and gripped by the pins 205.

The perforated film 201 is laterally stretched along the vertically spread path defined by the chains 203a and 203b. The sizes of the holes 213 are increased by lateral stretching to increase an air-permeability density to improve air permeability. The film 201 serving as the original roll is stretched to have a width larger than the height of the article 211. After the film is stretched at a predetermined magnification (preferably an apparatus stretch magnification of 2.2 times or more), the chain path becomes parallel. Alignment of the polymer molecules of the stretched film is stabilized in the parallel portion of the chain path. The film is released from the pins 205 at the terminal end of the tenter, thereby obtaining a stretched perforated film 206. The width of the laterally stretched film 206 is larger than the height of the article.

A roll 207 having tapered rotary members 208 for preventing widthwise shrinkage of the laterally stretched film is arranged in the next stage of the pin tenter unit. The tapered rotary members 208 are located at both side edge portions of the perforated film 201 The widthwise shrinkage of the film 206 laterally stretched by the pin tenter unit tends to occur. In order to prevent this, the film runs and is stretched in the widthwise direction while both the side edge portions of the film 206 are kept pressed by the tapered rotary members 208, thereby preventing widthwise shrinkage of the laterally stretched film.

In the next step, the article 211 is being rotated on the turntable 210, and almost all the side surfaces of the article 211 can be wrapped with the laterally stretched perforated film 209 by a plurality of revolutions. Almost all the side surfaces of the article 211 are wrapped with a laterally and longitudinally stretched film 209. The stretched film 209 is wound around all the side surfaces of the article 211 so that one side edge portion of the film 209 extends from the upper or lower end of the article 211. Reference numeral 209a denotes one side edge of the film 209 which extends from the upper or lower end of the article 211. The turntable 210 is kept rotated at a constant rotation speed by motor 212 or constant tension by a torque motor. Therefore, wrapping using a perforated film is completed.

In the third embodiment, since the perforated film is used as the original roll, the film is suitable to wrap an article which requires a high air and moisture permeability and requires prevention of dew condensation, such as vegetables and fruits. This film requires a small number of turns in wrapping and is effective if the number of holes is small. In addition, widthwise shrinkage of the film during stretching is small. Therefore, a wrapped body has a large width, and the wrapping time can be shortened. In addition, the amount of material film is small, cost is low, and an amount of material waste is small. In conventional applications, i.e., in a field of wrapping requiring air permeability and allowing large holes and in an application for maximally exposing contents upon wrapping, a net-like material is longitudinally stretched. According to the third embodiment, a large area can be assured by the same net as in the conventional technique, and the wrapping cost can be reduced. In addition, the wrapping time can be shortened. In addition, an amount of web to be treated upon unwrapping is advantageously small.

The size and number of holes can be determined in consideration of air permeability for a wrapping purpose, a retained tension of a web on an article, and the like. Each hole may be constituted by a slit. The film 44 with an additive shown in FIGS. 7 and 8 may be used in place of the perforated film. Alternatively, the corrugated film 48 shown in FIG. 9 may be used, the nets shown in FIGS. 11A and 11B may be used, or the unwoven fabric shown in FIG. 12 may be used.

In the third embodiment, the lateral stretch apparatus is not limited to the one shown in FIGS. 27 and 28, but can be replaced with another one. For example, the lateral stretch apparatus shown in FIGS. 3 and 4, FIGS. 13 and 14, or FIG. 23 may be used.

The guide roll shown in FIG. 25 may be used in place of the roll 207 having the tapered rotary members 208.

Figure 29:
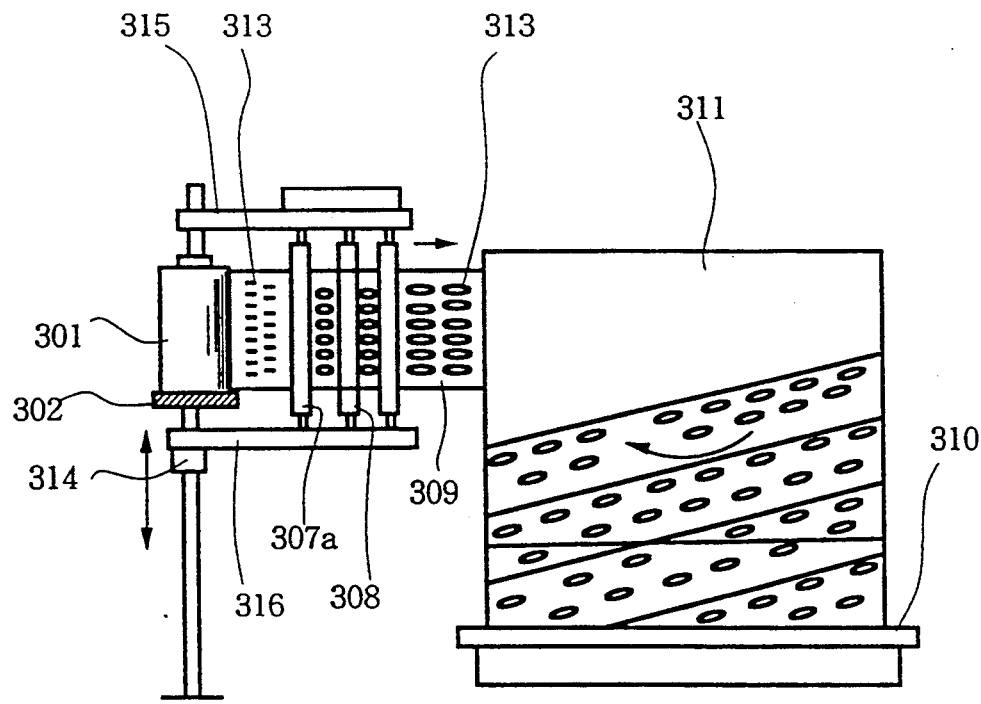
FIG. 29 is a side view showing a wrapping apparatus according to a fourth embodiment of the present invention.
Figure 30:
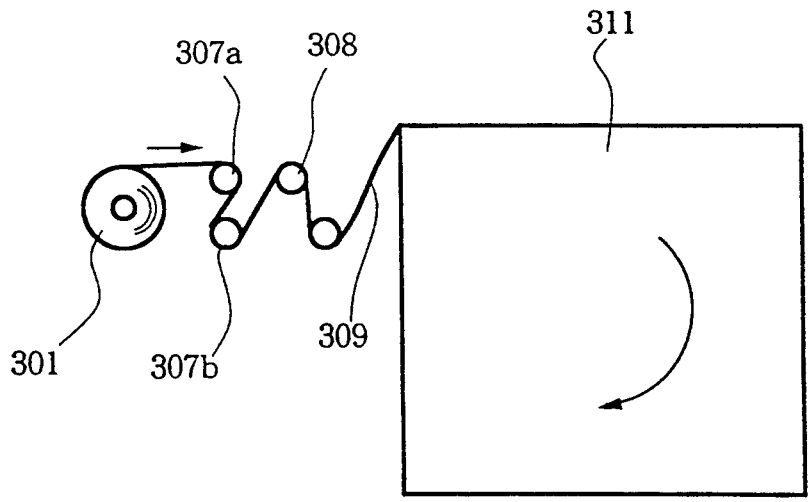
FIG. 30 is a plan view of the apparatus shown in FIG. 29.

The fourth embodiment of the present invention will be described with reference to FIGS. 29 and 30. FIGS. 29 and 30 show a wrapping system using a lateral stretch apparatus, in which FIG. 29 is a side view thereof, and FIG. 30 is a plan view thereof. An original roll 301 in the form of a roll stands upright on a table 302. This original roll is a perforated film. Reference numerals 313 denote holes formed in the film. Longitudinal stretch rolls 307 are located next to the table 302, and a dancer roll 308 is located next to the longitudinal stretch rolls 307a and 307b. The perforated film 301 is longitudinally stretched by the longitudinal stretch rollers 307a and 307b. The sizes of the holes 213 are increased by this lateral stretching to increase an air-permeability density, thereby improving air permeability. The tension of a longitudinally stretched perforated film 309 is controlled by the dancer roll 308. A turntable 310 is located next to the dancer roller 308. The turntable 310 is rotated at a constant speed using a motor or at a constant tension using a torque motor. On the other hand, the table 302, the longitudinal stretch rolls 307a and 307b, and the dancer roll 308 are supported by frames 315 and 316. These can be vertically moved by a lift unit 314 in directions indicated by a double-headed arrow.

The longitudinally stretched film 309 is supplied while the table 302 and the longitudinal stretch roll 307a are moved upward (or downward) by the lift unit 314. At the same time, the turntable 310 is rotated. By a plurality of revolutions or turns, the longitudinally stretched film 309 is wound around the article 311 placed on the turntable 310, thereby wrapping almost all the side surfaces of the article 311, thereby completing wrapping with a perforated film.

This fourth embodiment has the same effect as in the third embodiment because a perforated film is used as the original roll.

Each hole in the perforated film may be a slit. The film 44 with an additive shown in FIGS. 7 and 8 may be used in place of the perforated film. Alternatively, the corrugated film 48 shown in FIG. 9 may be used, the nets shown in FIGS. 11A and 11B may be used, or the unwoven fabric shown in FIG. 12 may be used. In the fourth embodiment, the longitudinal stretch apparatus is not limited to the one shown in FIGS. 29 and 30, but may be replaced with another one. In addition, instead of lifting the table 302 and the longitudinal stretch roll 307a, the turntable 310 may be lifted.

The fifth embodiment of the present invention will be described with reference to FIGS. 31 and 32. FIGS. 31 and 32 are schematic views showing the step of increasing the width of a slit film, in which FIG. 31 is a side view thereof, and FIG. 32 is a plan view thereof. An original roll 401 wound in the form of a roll stands upright on a table 402. This original roll is a perforated film. Reference numerals 413 denote holes (slits in this case) formed in the film. This perforated film 401 is supplied and longitudinally stretched between longitudinal stretch rolls 403a and 403b. When the distance between the longitudinal stretch rolls 403a and 403b is small, proximal stretching is performed. By this proximal stretching, the sizes of the slits 413 of the film are increased to have slightly increased widths, so that the air-permeability density of the film is increased to improve air permeability. The width of the stretched film is increased by an arcuated bar 405 and cross guiders 406a, 406b, 407a, and 407b through a turn roll 404. By this operation, the widths of the slits 413 are increased, and the resultant film is supplied to a step of wrapping an article with the film.

In this embodiment, the width is increased after longitudinal stretching. However, longitudinal stretching may be performed after the width is increased.

This fifth embodiment has the same effect as in the third embodiment because a perforated film is used as an original roll.

Each hole in the perforated film may be a slit. The film 44 with an additive shown in FIGS. 7 and 8 may be used in place of the perforated film. Alternatively, the corrugated film 48 shown in FIG. 9 may be used, the nets shown in FIGS. 11A and 11B may be used, or the unwoven fabric shown in FIG. 12 may be used.

In the fifth embodiment, the longitudinal stretch apparatus is not limited to the one shown in FIGS. 31 and 32, but may be replaced with another one.

The sixth embodiment of the present invention will be described with reference to FIG. 33.

Figure 33:
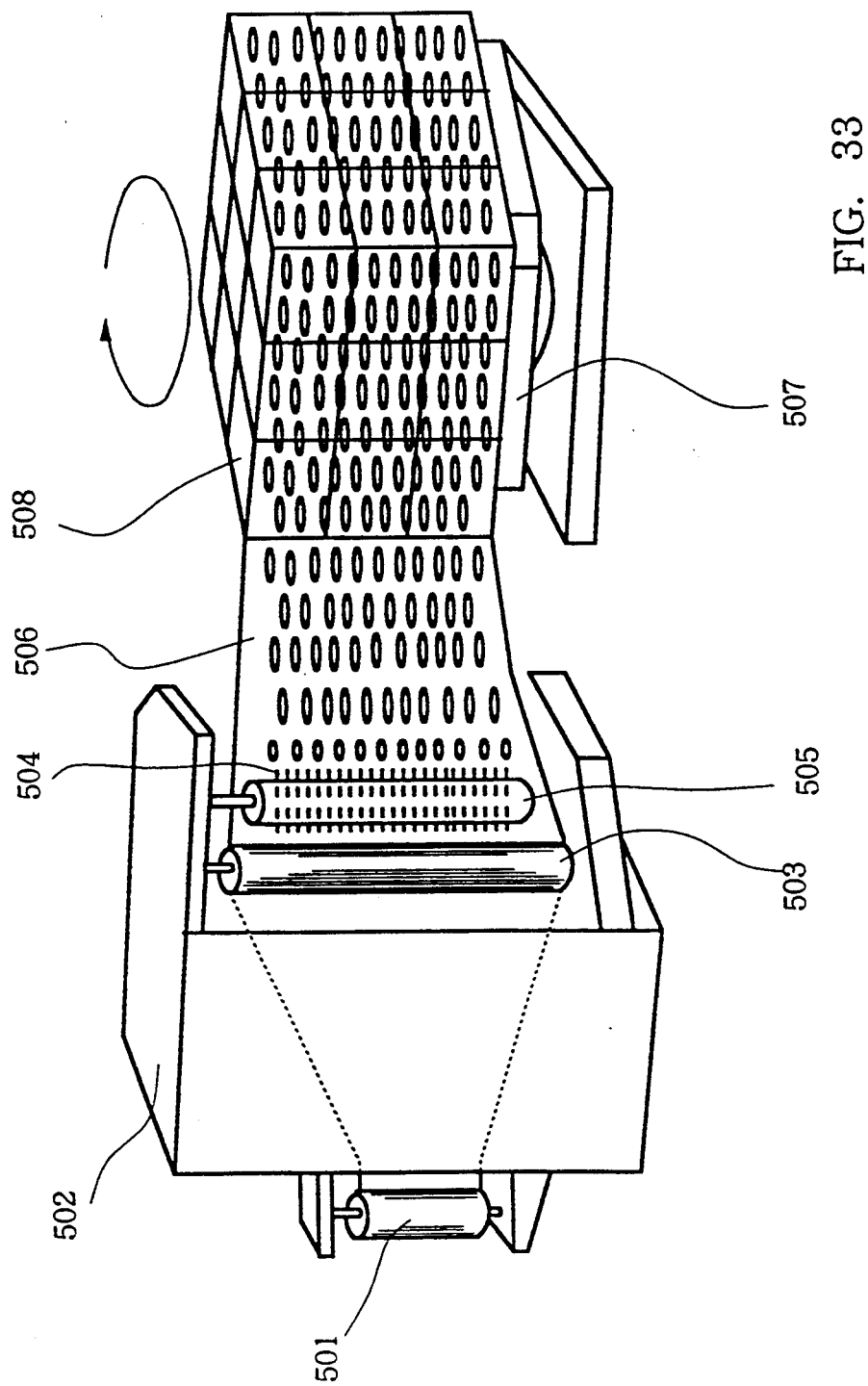
FIG. 33 is a perspective view showing a wrapping apparatus according to a sixth embodiment of the present invention.

FIG. 33 shows an arrangement for forming holes after a film is laterally stretched. An original roll film 501 is supplied and laterally stretched by a lateral stretch apparatus 502. The laterally stretched film is supplied from a roll 503 and is subjected to perforation by a pin roll 505. A large number of pins 504 extend on the pin roll 505. The pin roll 505 is heated to a temperature exceeding the melting point of the film, and the heated pins 504 are brought into contact with the laterally stretched film 506, thereby forming a large number of holes by heat. A large number of articles 508 placed on a rotating turntable 507 are wrapped with the perforated film 506. In this process, when the film is not perforated, the film is laterally stretched and is subjected to large widthwise shrinkage. Therefore, widthwise shrinkage can be advantageously reduced by perforating the film.

FIGS. 34A and 34B show a lateral stretch means. FIG. 34A shows a pair of longitudinally grooved rolls 511 and 512. A large number of protrusions 513 and a large number of recessed grooves 514 are formed on the surface of each of the rolls 511 and 512. FIG. 34B shows a state wherein a film 515 is inserted between these two rolls and is laterally stretched. When a plurality of stretch roll pairs are arranged, the lateral stretch magnification can be increased. In lateral stretching using these longitudinally grooved rolls, since the width of the film is not increased, this arrangement must be combined with a width increasing means.

The lateral stretch means is not limited to the one shown in FIG. 34 but may be replaced with another one. For example, the lateral stretch means shown in FIGS. 1 to 4 or FIGS. 13 to 23 may be used.

FIGS. 35 and 36 show a pin roll. FIG. 35 is a sectional view of a roll, and FIG. 36 is a side view thereof. A large number of pins 522 extend on a roll 521. A heater 525 may be inserted into this roll 521, and the roll 521 itself may be heated upon energization using a slip ring. A punching roll or an embossing roll may be used in place of this pin roll. When a film is to be perforated, a mating roll may be preferably arranged at a position opposite to the perforating roll through a film.

FIG. 37 shows a cutting blade longitudinal slitter. Cutting blades 524 are mounted on a disc-like spacer 523. The spacers with the blades are stacked in different phases to constitute a slitter roll. In place of this slitter, a heat blade slitter disclosed in Japanese Patent Publication No Sho 61-11757 issued to the present inventors, various types of splitters or slitters in the manufacture of split yarns can be used.

Figure 38:
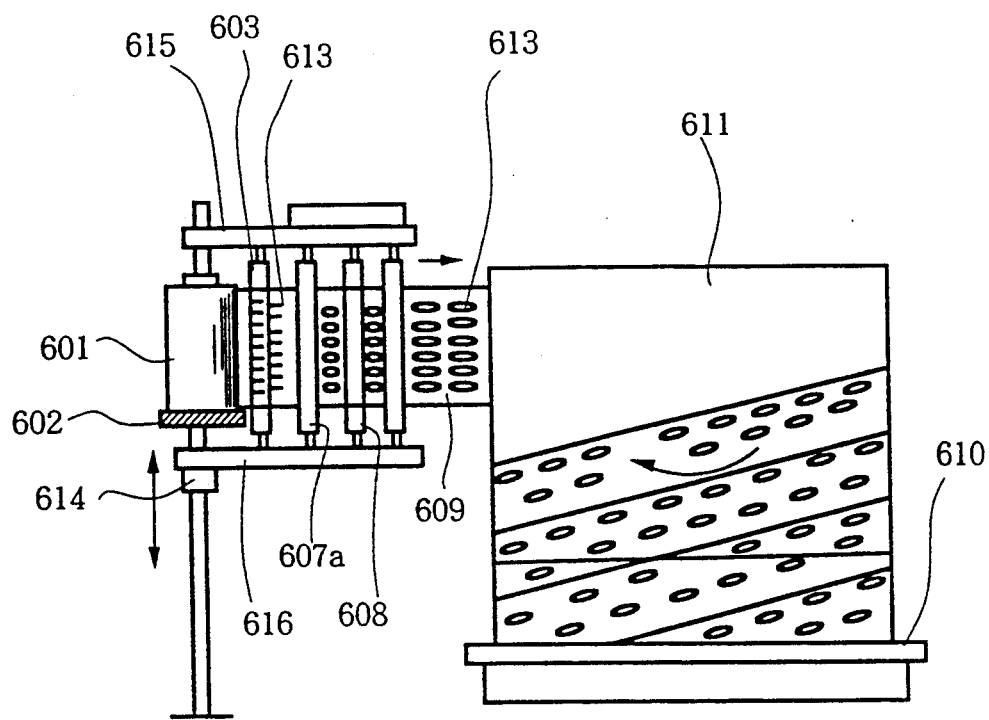
FIG. 38 is a side view showing a wrapping apparatus according to a seventh embodiment of the present invention.
Figure 39:
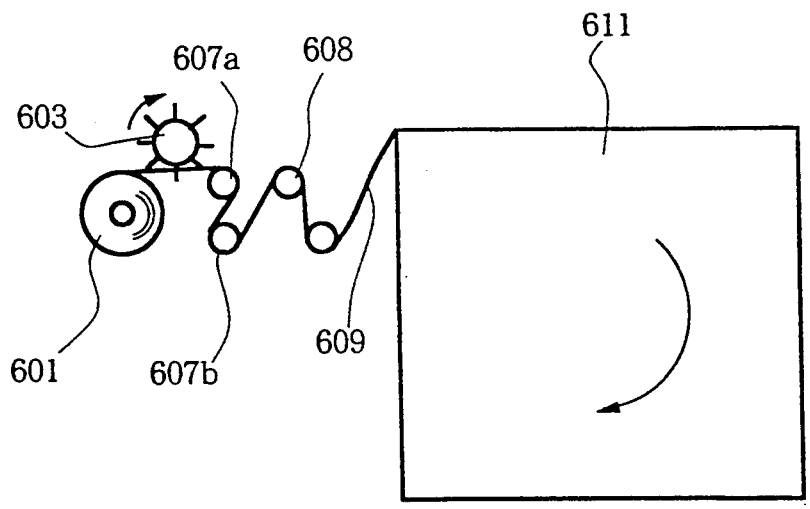
FIG. 39 is a plan view of the apparatus shown in FIG. 38.

The seventh embodiment of the present invention will be described with reference to FIGS. 38 and 39. FIGS. 38 and 39 show a wrapping system using a longitudinal stretch apparatus, in which FIG. 38 is a side view thereof, and FIG. 39 is a plan view thereof. An original roll 601 wound in the form of a roll stands upright on a table 602. The supplied original roll is perforated by a pin roll 603 immediately before longitudinal stretching. A pin roll shown in FIG. 33 or FIGS. 33 to 37 may be used as the pin roll 603. Reference numerals 613 denote holes formed in the film. Longitudinal stretch rolls 607 and 607b are located next to the pin roll 603. A dancer roll 608 is located next to the longitudinal stretch rolls 607a and 607b. The film 601 perforated by the longitudinal stretch rolls 607a and 607b is longitudinally stretched. Sizes of the holes 613 are increased by longitudinal stretching. A tension of a longitudinally stretched perforated film 609 is controlled by the dancer roll 608. A turntable 610 is located next to the dancer roll 608. The turntable 610 is rotated at a constant speed using a motor or at a constant tension using a torque motor. On the other hand, the table 602, the longitudinal stretch rolls 607a and 607b, and the dancer roll 608 are supported by frames 615 and 616.

These members can be lifted by a lift unit 614 in directions indicated by a double-headed arrow.

The longitudinally stretched film 609 is supplied while the table 602 and the longitudinal stretch roll 607a are moved upward (or downward) by the lift unit 614. At the same time, the turntable 610 is rotated. By a plurality of revolutions or turns, the longitudinally stretched film 609 is wound around the article 611 placed on the turntable 610, thereby wrapping almost all the side surfaces of the article 611, thereby completing wrapping with a perforated film.

This seventh embodiment has the same effect as in the third embodiment because a perforated film is used as the original roll.

Each hole may be a slit. In the seventh embodiment, the longitudinal stretch apparatus is not limited to the one shown in FIGS. 38 and 39, but may be replaced with another one. Instead of lifting the table 602 and the longitudinal stretch roll 607a, the turntable 610 may be lifted.

The eighth embodiment of the present invention will be described with reference to FIG. 40.

Figure 40:
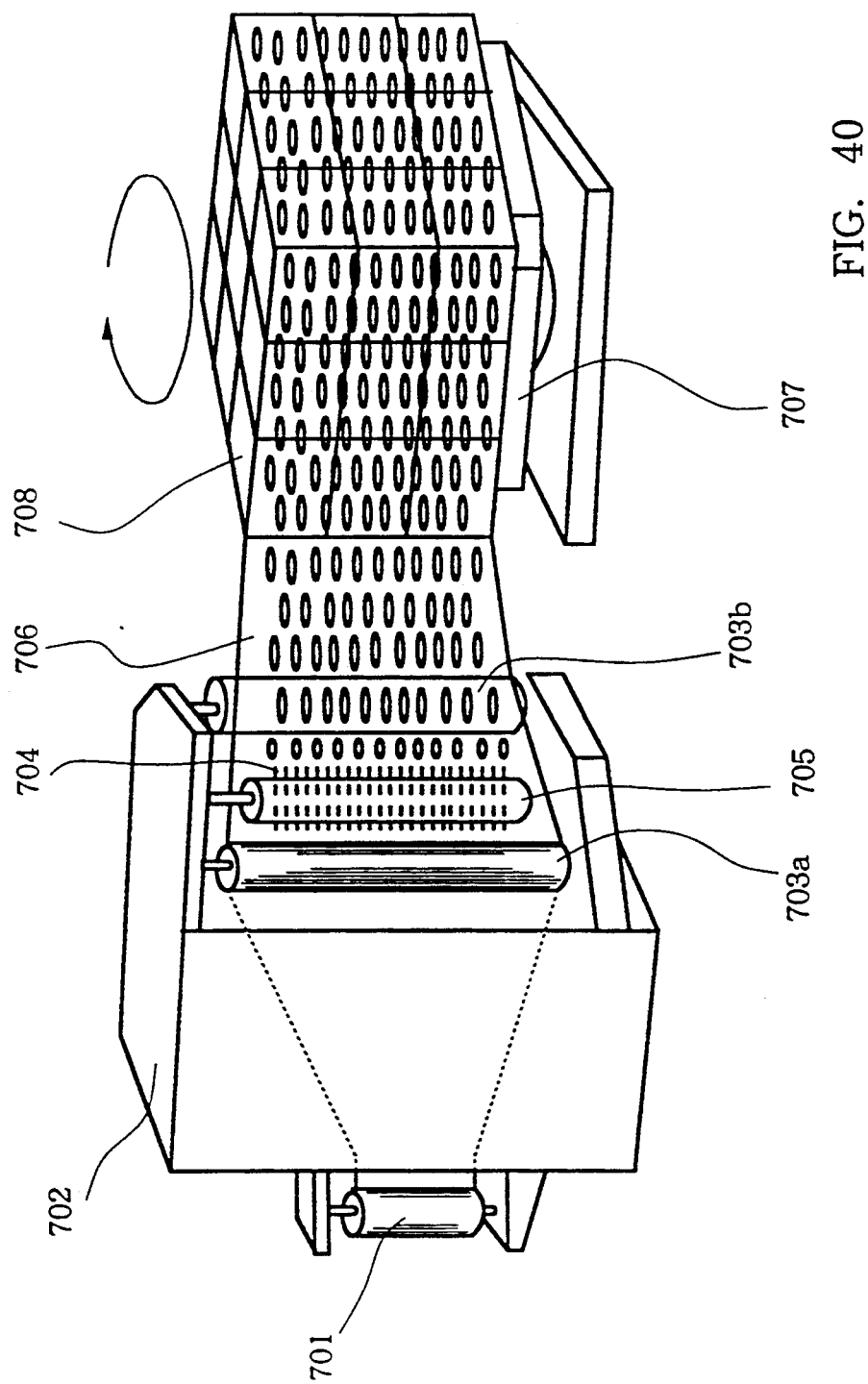
FIG. 40 is a perspective view showing a wrapping apparatus according to an eighth embodiment of the present invention.

In a system for longitudinally stretching a film after the lateral stretching is performed and for wrapping a large number of articles rotated on a turntable with a shrinkage tension produced by its stretching, an arrangement for forming holes in a film in longitudinal stretching is shown in FIG. 40. An original roll film 701 is supplied and laterally stretched by a lateral stretch apparatus 702. The laterally stretched film is then longitudinally stretched between post-longitudinal stretch rolls 703a and 703b. The surface speed of the roll 703b is larger than that of the roll 703a by a longitudinal stretch magnification. In the arrangement for performing longitudinal stretching, a roll 705 having a large number of pins 704 on its surface is arranged. The pin roll 705 is heated to a temperature exceeding the film melting point. The heated pins 704 are brought into contact with the film during longitudinal stretching to form a large number of holes in the film 706. The perforated film 706 wraps the large number of articles 708 together located on the rotating turntable 707 with a shrinkage tension generated by stretching of the film. In this process, when a film is not perforated, the film is laterally stretched and is subjected to large widthwise shrinkage. Therefore, widthwise shrinkage can be advantageously reduced by perforating the film.

The lateral stretch means described with reference to FIG. 34 may be used. The lateral stretch means described in FIGS. 1 to 4 or FIGS. 13 to 23 may be used. A pin roll 703 may be replaced with the one exemplified in FIG. 33 or FIGS. 35 to 37.

The ninth embodiment of the present invention will be described with reference to FIGS. 41 and 42. FIGS. 41 and 42 are schematic views showing the step of increasing the width of a slit film, in which FIG. 41 is a side view thereof and FIG. 42 is a plan view thereof. An original roll 801 wound in the form of a roll stands upright by a table 802. Slits are formed in the supplied original roll 801 by a longitudinal slitter roll 803. That is, staggered slits are formed by the longitudinal slitter roll 803 rotated at a surface speed higher than the film speed. A roll shown in FIG. 37 may be applied as the longitudinal slitter roll 803. Reference numerals 813 denote slits. This film 801 is longitudinally stretched between longitudinal stretch rolls 803a and 803b. When the distance between these longitudinal stretch rolls 803a and 803b is small, proximal stretching is performed. By this proximal stretching, the widths of the film slits 813 are increased to have slightly increased widths. The width of the stretched film is increased by an arcuated bar 805 and cross guiders 806a, 806b, 807a, and 807b through a turn roll 804. The widths of the slits 813 are increased by a width increasing operation. Thereafter, the film is supplied to a step of wrapping an article.

In this embodiment, an increase in width is performed after longitudinal stretching is performed. However, slits may be formed after longitudinal stretching is performed. Alternatively, longitudinal stretching may be performed after the slits are formed and their widths are increased. As another method, a longitudinal slitter may form slits in a laterally stretched film.

In the ninth embodiment, since the film is perforated or slitted, and the widths of the slits are increased, the same effect as in the third embodiment described above can be obtained. In the ninth embodiment, the longitudinal stretch apparatus is not limited to the one shown in FIGS. 41 and 42. Any other longitudinal stretch apparatus may be used.

As has been described above, according to the present invention, there are provided an easy-to-handle, compact wrapping apparatus using a small amount of original roll used and having a short wrapping time, and a method therefor. There are also provided a wrapping apparatus capable of providing a wrapping form which provides air- and moisture-permeable properties and prevents dew condensation and capable of reducing widthwise shrinkage in the stretching process, and a method therefor.

What is claimed is:

1. A wrapping apparatus for stretching a band-like member and winding the stretched band-like member around at least one article having a predetermined height, comprising:

means for supplying a band-like member which will elastically shrink when it is stretched, said band-like member having two widthwise opposite ends and initial lateral width;

lateral stretch means for stretching said band-like member at least twice as long as said initial lateral width thereof whereby a band-like member is obtained stretched in the lateral direction, said lateral strength means being provided with running means moving at a predetermined speed for running said stretched band-like member whereby said stretched band-like member is spread like an unfolded fan and gripping means for gripping regions respectively near said widthwise opposite ends of said stretched band-like member in such a manner that said regions of said stretched band-like member are detachable from said running means;

a longitudinal post-stretch mechanism for longitudinally stretching said stretched band-like member after the stretched band-like member is laterally stretched by said lateral stretch means:

a turntable on which said at least one article is placed, said turntable being rotatable around an axis approximately parallel to said lateral direction of said lateral stretch means; and means for winding said stretched band-like member around said at least one article by rotating the turntable with respect to the stretched band-like member at a speed higher than said pre-determined speed of said lateral stretch means, said winding means operating with tension and comprising means for regulating said winding tension of the stretched band-like member around the article, wherein said running means comprises a first running portion and a second running portion and said running means comprises a first rotary disc having a peripheral portion constituting said first running portion and a second rotary disc having a peripheral surface constituting said second running portion, and said gripping means comprises a first gripping member for detachably fixing the region of one of said opposite widthwise ends of said stretched band-like member to said first running portion, and a second gripping member for fixing the region of the other of said opposite widthwise ends of said stretched band-like member so that it is detachable from said second running portion, guide means for guiding said stretched band-like member gripped by said gripping means wherein said guide means comprises rotatable guide turn rolls, said first and second rotary discs have a periphery, said guide turn rolls are arranged such that each roll substantially touches internally to the periphery of the cylinder-like shape formed by the first and second rotary discs, for guiding the band-like member so that the difference in running length of the band-like member is reduced in the widthwise direction.

2. The apparatus according to claim 1, wherein said first running portion is moved along a first endless route having a first forward path used for running of the region near one of said widthwise opposite ends of said stretched band-like member for a first running length and a first non-used backward path; said second running portion is moved along a second endless route having a second forward path used for running of the region near the other one of said widthwise opposite end portions of said band-like member for a second running length, the second forward path and the first forward path being gradually increased as the band-like member runs, and a second non-used backward path.

3. The apparatus according to claim 1, wherein said stretched band-like member has a central portion and said guide turn rolls comprise a first guide portion for guiding said central portion of said stretched band-like member and a second guide portion for guiding portions between said central portion of the stretched band-like member and said opposite widthwise ends thereof.

4. The apparatus according to claim 1, further comprising means for heating said band-like member.

5. The apparatus according to claim 1, wherein said longitudinal post-stretch mechanism comprises a stretch member for longitudinally stretching said laterally stretched band-like member released from said running means while the amount of widthwise shrinkage caused by a widthwise shrinking force of the laterally stretched band-like member is small.

6. The apparatus according to claim 1, wherein an article placing region having a predetermined height is defined on said turntable, and said lateral stretch means comprises means for stretching said band-like member in the lateral direction whereby said band-like member has a larger width than the height of the article placing region.

7. The apparatus according to claim 1, wherein said winding means rotates said article about an axis except for a vertical axis.

8. The apparatus according to claim 1, further comprising means for preventing widthwise shrinkage of said lateral stretched band-like member.

9. The apparatus according to claim 1, further comprising means for changing the strength magnification.

10. The wrapping apparatus according to claim 1 further comprising hole forming means forming holes in said stretched band-like member before said stretched band-like member is wound around the stacked articles.

11. The apparatus according to claim 10, further comprising means for heating said hole forming means.

12. The apparatus according to claim 10, wherein said hole forming means comprises means for forming slits parallel to the length of said band-like member.

13. The apparatus according to claim 10, further comprising width increasing means for increasing the width of the band-like member stretched by said stretch means and perforated by said hole forming means.

14. The apparatus according to claim 1, wherein said first and second rotary discs are two pulleys, and said first and second gripping members are endless belts engaging with the pulleys.

15. The apparatus according to claim 1, wherein the longitudinal stretch means is located downstream of the lateral stretch means, and the distance between both of said longitudinal stretch means and said lateral stretch means is 800 mm or less.

16. The apparatus according to claim 1 wherein said article has a cylindrical shape, said longitudinal stretch means are located downstream of said lateral stretch means, said article is placed on rolls.

17. A wrapping apparatus for stretching a band-like member and winding the stretched band-like member around at least one article having a predetermined height, comprising:

means for supplying a band-like member which will elastically shrink when it is stretched, said band-like member having two widthwise opposite ends and initial lateral width;

lateral stretch means for stretching said band-like member at least twice as long as said initial lateral width thereof whereby a band-like member is obtained stretched in the lateral direction, said lateral strength means being provided with running means moving at a predetermined speed for running said stretched band-like member whereby said stretched band-like member is spread like an unfolded fan and gripping means for gripping regions respectively near said widthwise opposite ends of said stretched band-like member in such a manner that said regions of said stretched band-like member are detachable from said running means;

a longitudinal pre-stretch mechanism for longitudinally stretching said stretched band-like member disposed upstream of said lateral stretch means;

a turntable on which said at least one article is placed, said turntable being rotatable around an axis approximately parallel to said lateral direction of said lateral stretch means; and means for winding said stretched band-like member around said at least one article by rotating the turntable with respect to the stretched band-like member at a speed higher than said pre-determined speed of said lateral stretch means, said winding means operating with tension and comprising means for regulating said winding tension of the stretched band-like member around the article, wherein said running means comprises a first running portion and a second running portion and said running means comprises a first rotary disc having a peripheral portion constituting said first running portion and a second rotary disc having a peripheral surface constituting said second running portion, and said gripping means comprises a first gripping member for detachably fixing the region of one of said opposite widthwise ends of said stretched band-like member to said first running portion, and a second gripping member for fixing the region of the other of said opposite widthwise ends of said stretched band-like member so that it is detachable from said second running portion, guide means for guiding said stretched band-like member gripped by said gripping means wherein said guide means comprises rotatable guide turn rolls, said first and second rotary discs have a periphery, said guide turn rolls are arranged such that each roll substantially touches internally to the periphery of the cylinder-like shape formed by the first and second rotary discs, for guiding the band-like member so that the difference in running length of the band-like member is reduced in the widthwise direction.

18. The apparatus according to claim 17, wherein said supplying means operate at a third predetermined speed, said longitudinal pre-stretch mechanism comprises means for longitudinal stretching said band-like member at said second predetermined speed of said lateral stretch means, which is made higher than said third predetermined speed of said supplying means.

* * * * *